(12) United States Patent
Tsuboki et al.

(10) Patent No.: US 8,255,646 B2
(45) Date of Patent: Aug. 28, 2012

(54) STORAGE APPARATUS AND LOGICAL VOLUME MIGRATION METHOD

(75) Inventors: Masanao Tsuboki, Oiso (JP); Kazuyoshi Serizawa, Tama (JP); Shunji Kawamura, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 900 days.

(21) Appl. No.: 12/010,978

(22) Filed: Jan. 31, 2008

(65) Prior Publication Data

US 2009/0125675 A1    May 14, 2009

(30) Foreign Application Priority Data

Nov. 9, 2007    (JP) ................................ 2007-292342

(51) Int. Cl.
*G06F 12/00* (2006.01)
*G06F 13/00* (2006.01)
*G06F 13/28* (2006.01)

(52) U.S. Cl. .. 711/161; 711/154; 711/170; 711/E12.103
(58) Field of Classification Search .......................... None
See application file for complete search history.

(56) References Cited

U.S. PATENT DOCUMENTS

| | | | |
|---|---|---|---|
| 6,199,146 B1 * | 3/2001 | Pence ............................ | 711/154 |
| 6,892,275 B2 * | 5/2005 | Bolt et al. ..................... | 711/114 |
| 6,895,483 B2 * | 5/2005 | Eguchi et al. ................. | 711/165 |
| 7,529,784 B2 * | 5/2009 | Kavuri et al. .......................... | 1/1 |
| 7,627,617 B2 * | 12/2009 | Kavuri et al. ......................... | 1/1 |
| 2005/0114410 A1 * | 5/2005 | Fujibayashi .................. | 707/204 |
| 2005/0188252 A1 * | 8/2005 | Amano ............................ | 714/6 |
| 2005/0198450 A1 * | 9/2005 | Corrado et al. ............... | 711/162 |
| 2005/0198451 A1 * | 9/2005 | Kano et al. .................... | 711/162 |
| 2006/0053250 A1 * | 3/2006 | Saze ............................. | 711/114 |
| 2007/0250679 A1 * | 10/2007 | Umemura et al. ............ | 711/170 |
| 2008/0155223 A1 * | 6/2008 | Hiltgen et al. ................ | 711/173 |
| 2009/0177836 A1 * | 7/2009 | Mimatsu ....................... | 711/111 |
| 2010/0100696 A1 * | 4/2010 | Suzuki .......................... | 711/162 |

FOREIGN PATENT DOCUMENTS

JP    2000-100053    9/1998

* cited by examiner

*Primary Examiner* — Edward Dudek, Jr.
*Assistant Examiner* — Matthew Chrzanowski
(74) *Attorney, Agent, or Firm* — Volpe And Koenig, P.C.

(57) ABSTRACT

This storage apparatus includes a first logical volume migration unit for migrating the logical volume of a first storage area targeted for power source shutdown to a second storage area that is not targeted for power source shutdown based on an external command, and a second logical volume migration unit for migrating an expiration date-defined logical volume from the second storage area to a third storage area of a post-expiration migration destination when the expiration date of the expiration date-defined logical volume set with an expiration date for migrating the logical volume is reached. The first logical volume migration unit balances and migrates the expiration date-defined logical volume to the second storage area by referring to the expiration date of the expiration date-defined logical volume and taking into consideration the migration timing to the third storage area.

8 Claims, 22 Drawing Sheets

- POWER SAVING PROGRAM — 41
- LOGICAL VOLUME MIGRATION PROGRAM — 42
- EXPIRATION DATE MANAGEMENT TABLE — 43
- EXPIRATION DATE EVALUATION MANAGEMENT TABLE — 44
- MEMORY — 37

| ID | EXPIRATION DATE | LOGICAL VOLUME ID | MIGRATION SOURCE RAID GROUP ID | MIGRATION DESTINATION RAID GROUP ID |
|---|---|---|---|---|
| 1 | Time-1 | | | |
| 2 | Time-2 | | | |
| ... | ... | | | |
| N(a) | Time-T(a) | | | |

| ID | EXPIRATION DATE | RAID GROUP A | RAID GROUP B | ... | RAID GROUP Z | EVALUATION (TIMING) |
|---|---|---|---|---|---|---|
| 1 | Time-1 | | | | | |
| 2 | Time-2 | | | | | |
| ... | ... | | | | | |
| N(b) | Time-T(b) | | | | | |
| ⊠ | EVALUATION (CONCENTRATION) | | | | | |

44A | 44B | 44C | 44D (rightmost column) | 44E (bottom row)

FIG.9
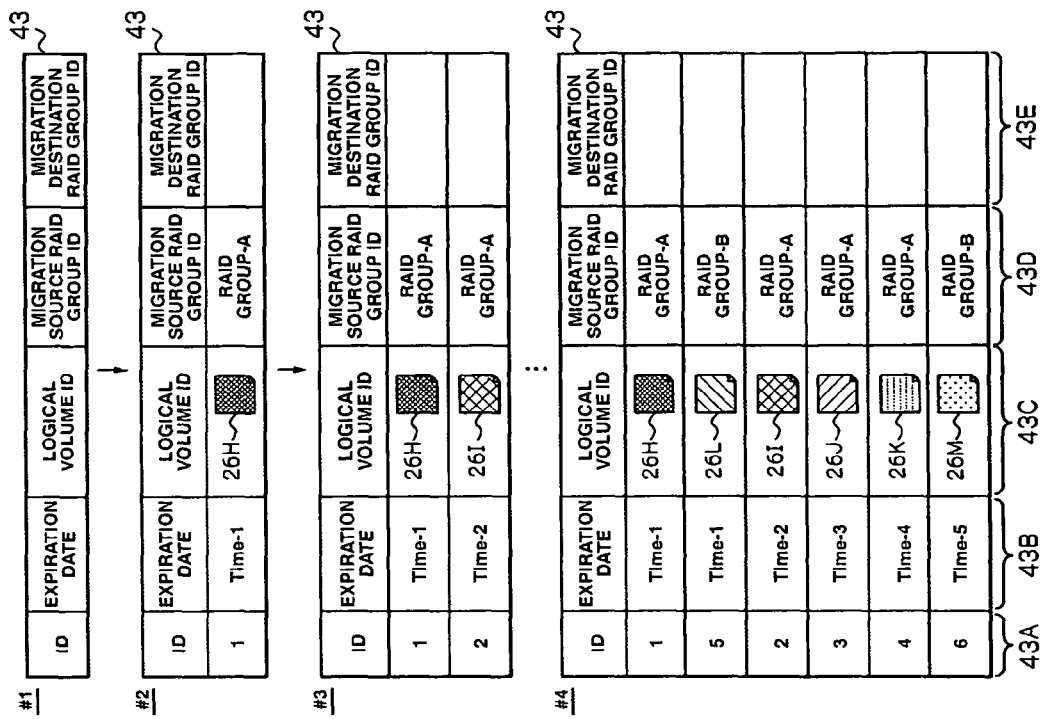
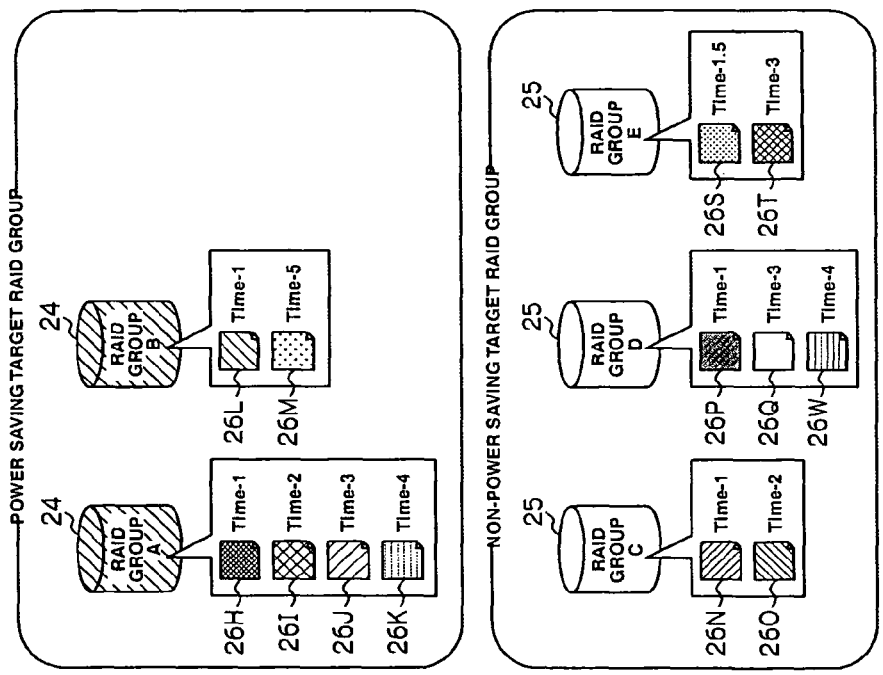

STORAGE APPARATUS AND LOGICAL VOLUME MIGRATION METHOD

CROSS REFERENCES

This application relates to and claims priority from Japanese Patent Application No. 2007-292342, filed on Nov. 9, 2007, the entire disclosure of which is incorporated herein by reference.

BACKGROUND

The present invention relates to a storage apparatus and a logical volume migration method, and, for instance, can be suitably applied to a storage apparatus that performs power saving processing of hard disk drives.

Conventionally, with a storage apparatus storing data, there is a method for managing a plurality of hard disk drives (HDDs) in RAID (Redundant Array of Independent Disks) format. In this storage apparatus, at least one or more logical volumes (hereinafter referred to as the "logical volumes") are formed in a physical storage area (RAID group) provided by a plurality of hard disk drives.

Meanwhile, in recent years, information society is rapidly developing, and the computerization of information is also rapidly advancing. Under these circumstances, the importance of storage apparatuses that store electronic information goods is increasing, and the capacity of such storage apparatuses is ever increasing. On the other hand, however, the operation costs of storage apparatuses are becoming a problem, and the current status is that needs for realizing the power saving of storage apparatuses are increasing.

Thus, proposed is a storage apparatus that seeks power saving by shutting down the hard disk drives of the RAID group when a given standby time is set to the memory in the storage apparatus, and there is no access during such standby time (for instance, refer to Japanese Patent Laid-Open Publication No. 2000-100053).

Also in recent years, there is a storage apparatus that seeks power saving by designating the hard disk drives of the RAID group to be subject to power saving, migrating data to the hard disk drives of the RAID group or another storage apparatus in which the logical volumes formed in such RAID group will not be subject to power saving, and thereafter shutting down the hard disk drives of the RAID group to be subject to power saving.

Nevertheless, in cases where an expiration date, which is a deadline for migrating a logical volume to another RAID group or another storage apparatus, is set in the logical volume, and logical volumes having the same expiration date are migrated to the same RAID group in a concentrated manner upon migration of such logical volumes, the logical volumes will be migrated as a result of the expiration date being reached around the same time.

Consequently, the hard disk drives in the RAID group will become overloaded, and there is a problem in that the data access performance from the host system to the logical volumes of the RAID group will deteriorate significantly.

SUMMARY

The present invention was devised in view of the foregoing points. Thus, an object of this invention is to propose a storage apparatus and a logical volume migration method capable of preventing the deterioration in performance.

In order to achieve the foregoing object, the present invention provides a storage apparatus including a logical volume defined in a storage area provided by one or more hard disk drives and for storing data sent from a host system. This storage apparatus comprises a first logical volume migration unit for migrating the logical volume of a first storage area targeted for power source shutdown to a second storage area that is not targeted for power source shutdown based on an external command, a power source shutdown unit for shutting down the power source of the hard disk drive of the first storage area after the logical volume is migrated by the first logical volume migration unit, and a second logical volume migration unit for migrating an expiration date-defined logical volume from the second storage area to a third storage area of a post-expiration migration destination when the expiration date of the expiration date-defined logical volume set with an expiration date for migrating the logical volume is reached. The first logical volume migration unit balances and migrates the expiration date-defined logical volume to the second storage area by referring to the expiration date-defined logical volume and taking into consideration the migration timing to the third storage area.

Accordingly, since a plurality of expiration date-defined logical volumes stored in the same second storage area in a concentrated manner will reach their expiration date around the same time and be migrated to a third storage area, it is possible to effectively prevent the hard disk drives of the storage area from becoming overloaded. Consequently, it is possible to prevent the deterioration in performance such as the data access during the migration of the expiration date-defined logical volumes.

The present invention additionally provides a logical volume migration method of a storage apparatus including a logical volume defined in a storage area provided by one or more hard disk drives and for storing data sent from a host system. This logical volume migration method comprises a first step of migrating the logical volume of a first storage area targeted for power source shutdown to a second storage area that is not targeted for power source shutdown based on an external command, a second step of shutting down the power source of the hard disk drive of the first storage area after the logical volume is migrated at the first step, and a third step of migrating an expiration date-defined logical volume from the second storage area to a third storage area of a post-expiration migration destination when the expiration date of the expiration date-defined logical volume set with an expiration date for migrating the logical volume is reached. At the first step, the expiration date-defined logical volume is balanced and migrated to the second storage area by referring to the expiration date-defined logical volume and taking into consideration the migration timing to the third storage area.

Accordingly, since a plurality of expiration date-defined logical volumes stored in the same second storage area in a concentrated manner will reach their expiration date around the same time and be migrated to a third storage area, it is possible to effectively prevent the hard disk drives of the storage area from becoming overloaded. Consequently, it is possible to prevent the deterioration in performance such as the data access during the migration of the expiration date-defined logical volumes.

According to the present invention, it is possible to realize a storage apparatus and a data migration method capable of preventing the deterioration in performance.

DESCRIPTION OF DRAWINGS

FIG. 4 is a conceptual diagram explaining the outline of an expiration date evaluation management table;

FIG. 9 is a conceptual diagram explaining expiration date management table creation processing;

DETAILED DESCRIPTION

An embodiment of the present invention is now explained in detail with reference to the attached drawings.

(1) First Embodiment (1-1) Configuration of Storage System

Figure 1:
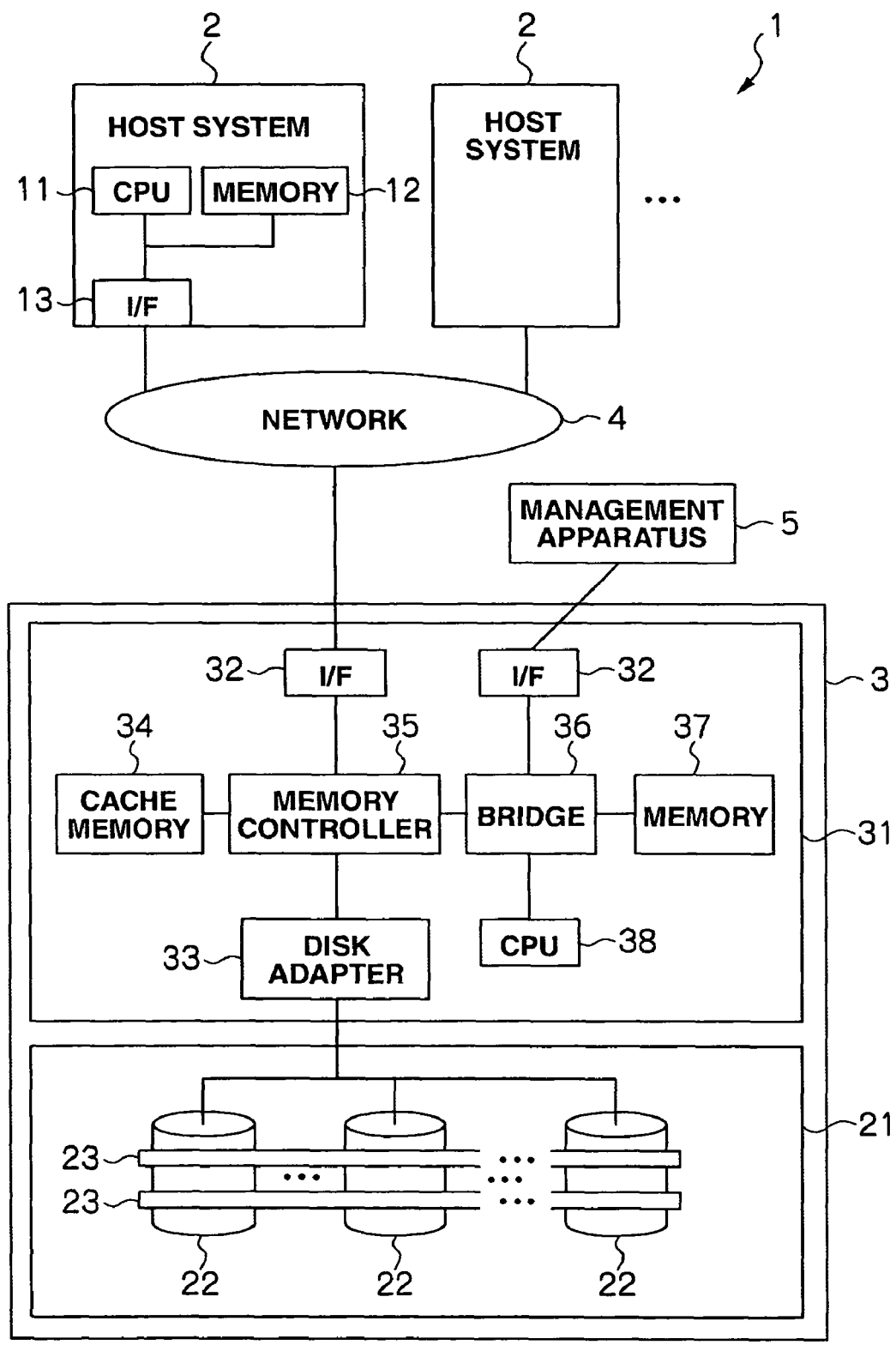
FIG. 1 is a block diagram showing the configuration of a storage system according to an embodiment of the present invention.

FIG. 1 shows an example of a storage system 1 according to the first embodiment. The storage system 1 is configured by a host system 2 and a storage apparatus 3 being connected via a network 4, and a management apparatus 5 being connected to the storage apparatus 3.

The host system 2 is a versatile computer, and comprises a CPU (Central Processing Unit) 110, a memory 12, and an interface (I/F) 13. The CPU 11 is a processor that governs the operational control of the overall host system 2. The host system 2 executes various types of processing by the CPU 11 executing the software stored in the memory 12. In addition to storing various types of software, the memory 12 is also used as a work memory of the CPU 11. The interface 13 is used for enabling communication between the CPU 11 and the storage apparatus 3 via the network 4.

The storage apparatus 3 comprises a memory apparatus 21 configured from a plurality of hard disk drives 22, and a control unit 31 for controlling the hard disk drives 22 of the memory apparatus 21.

The hard disk drive 22, for instance, is configured from an expensive disk drive such as an FC (Fibre Channel) disk, or an inexpensive disk such as a SATA (Serial AT Attachment) disk drive or an optical disk drive. One or more logical volumes (hereinafter referred to as the "logical volumes 26" (described later)) are defined in the storage area (hereinafter referred to as the "RAID group 23") provided by one or more hard disk drives 22. Data from the host system 2 is accessed (read from and written into) the logical volumes 26 in block units of a prescribed size.

A unique identifier (Logical Unit Number: LUN) is allocated to each logical volume 26. In the case of this embodiment, the input and output of data are performed by setting the combination of the foregoing identifier and a unique number (LBA: Logical Block Address) that is allocated to the respective logical blocks as the address, and designating this address.

The control unit 31 comprises a plurality of interfaces (I/F) 32, a disk adapter 33, a cache memory 34, a memory controller 35, a bridge 36, a memory 37, and a CPU 38.

The interface 32 is an interface to the network 4 and the management apparatus 5, and is used for sending and receiving write data, read data and various commands to and from the host system 2 and the management apparatus 5. The disk adapter 33 is an interface to the memory apparatus 21, and, for example, is used for sending and receiving write data, read data or various commands to and from the memory apparatus 21 according to a fibre channel protocol.

The cache memory 34, for instance, is configured from a nonvolatile semiconductor memory, and is used for temporarily storing commands from the host system 2 and data to be read from and written into the memory apparatus 21. The memory controller 35 controls the data transfer between the cache memory 34 and the memory 37, and the data transfer between the cache memory 34 and the disk adapter 33. The bridge 36 is used for sending and receiving read commands and write commands and performing filing processing and the like between the memory controller 36 and the CPU 38, or between the memory controller 36 and the memory 37.

In addition to being used for retaining various control programs and various types of control information, the memory 37 is also used as a work memory of the CPU 38. The various programs and various tables stored in the memory 37 will be described later. The CPU 38 is a processor for controlling the input and output of data to and from the memory apparatus 21 in response to the read command or write command sent from the host system 2, and controls the interface 34, the disk adapter 33, the memory controller 35 and the like based on various control programs and various types of control information stored in the memory 37.

The management apparatus 5 is a computer device comprising information processing resources such as a CPU and a memory, and, for example, is configured from a personal computer, a workstation or the like. The management apparatus 130 comprises a display device for displaying a GUI (Graphical User Interface) and various types of information for configuring various settings in the storage apparatus 3, and an input device such as a keyboard or a mouse for the system administrator to perform various operations or input various settings. The management apparatus 5 executes various types of processing based on various commands input via the input device.

Figures 2, 3:
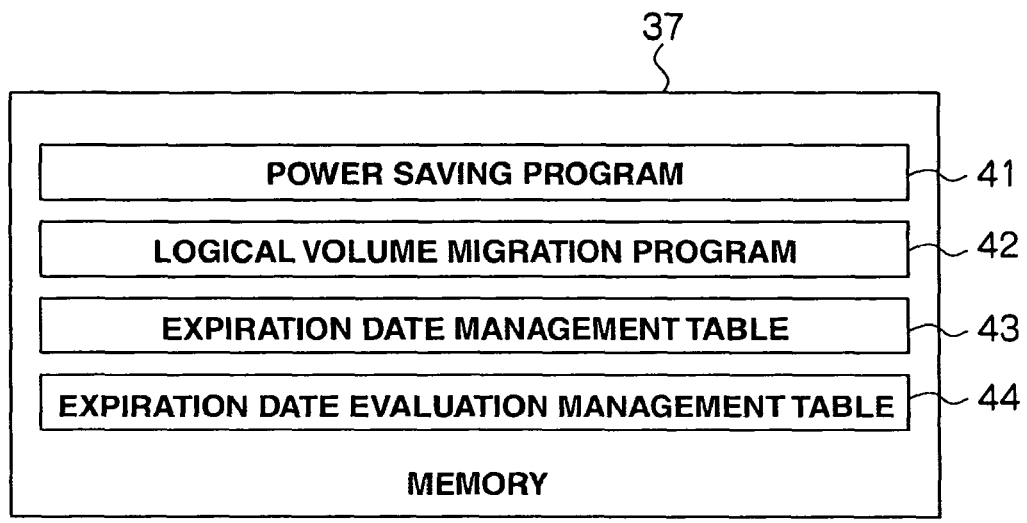
FIG. 2 is a conceptual diagram explaining the various programs and various tables stored in a memory.
FIG. 3 is a conceptual diagram explaining the outline of an expiration date management table.

FIG. 2 shows an example of the various programs and various tables stored in the memory 37. The memory 37 stores a power saving program 41, a logical volume migration program 42, an expiration date management table 43, and an expiration date evaluation management table 44.

The power saving program 41 is a program for the CPU 38 to shut down the power source of the hard disk drives 22 of the RAID group 23 based on a command from the management apparatus 5. The logical volume migration program 42 is a program for the CPU 38 to migrate the logical volume 26 to another RAID group 23 or another storage apparatus when the expiration date (LDEV Guard or the like), which is a deadline for migrating the logical volume 26 to another RAID group 23 or another storage apparatus, of such logical volume 26 is reached. When an expiration date is set in the logical volume 26, this is also simultaneously set in the RAID group 23 of the post-expiration migration destination, and such logical volume will no longer be updated.

FIG. 3 shows an example of the expiration date management table 43. The expiration date management table 43 manages the identification ID and the corresponding logical volume 26, expiration date, migration source RAID group 23 and migration destination RAID group 23. The expiration date management table 43 is configured from an identification ID column 43A, an expiration date column 43B, a logical volume ID column 43C, a migration source RAID disk ID column 43D, and a migration destination RAID group ID column 43E.

The identification ID column 43A manages the identification ID, which is an identifier for uniquely identifying the entry for writing related information in a horizontal row in the expiration date management table 43. The expiration date column 43B manages the expiration date set in the logical volume 26. The expiration date column 43B stores "-" when an expiration date is not set in the logical volume 26.

The logical volume ID column 43C manages the logical volume ID, which is an identifier for uniquely identifying the logical volume 26. The migration source RAID disk ID column 43D manages the migration source RAID group ID, which is an identifier for uniquely identifying the migration source RAID group 23 that is currently storing the logical volume 26. The migration destination RAID disk ID column 43E manages the migration destination RAID group ID, which is an identifier for uniquely identifying the migration destination RAID group 23 of the logical volume 26. The migration source RAID disk ID column 43D and the migration destination RAID group ID column 43E store "-" when an expiration date is not set in the logical volume 26.

FIG. 4 shows an example of the expiration date evaluation management table 44. The expiration date evaluation management table 44 manages the identification ID and the corresponding expiration date, number of logical volumes 26 having that expiration date (evaluation (timing)), and the total number of logical volumes 26 in each RAID group 23 (evaluation (concentration)). The expiration date evaluation management table 44 is configured from an identification ID column 44A, an expiration date column 44B, a RAID group column 44C, an evaluation (timing) column 44D, and an evaluation (concentration) column 44E. The RAID group column 44C configures a RAID group column for each RAID group ID.

The identification ID column 44A and the expiration date column 44B manage the identification ID and the expiration date as with the identification ID column 43A and the expiration date column 43B described above. The RAID group column 44C manages the number of logical volumes 26 set with the foregoing expiration date in each RAID group 23. The evaluation (timing) column 44D manages the total number of logical volumes 26 set with the foregoing expiration date. The evaluation (concentration) column 44E manages the total number of logical volumes 26 in each RAID group 23.

(1-2) Outline of Power Saving Processing and Logical Volume Migration

Figure 5:
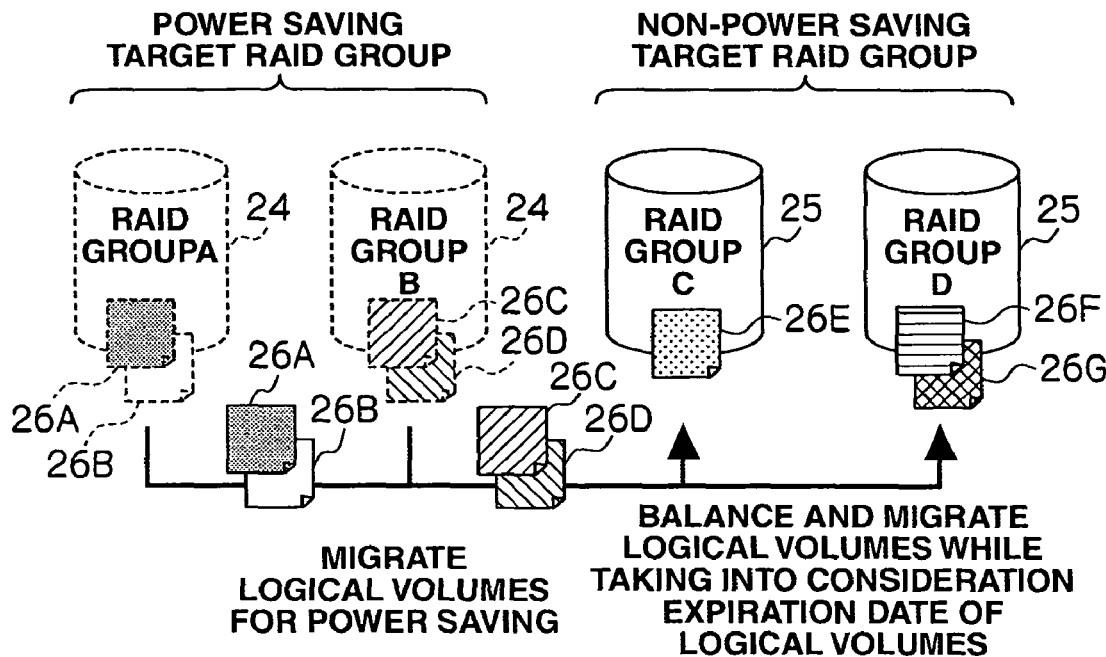
FIG. 5 is a conceptual diagram explaining the outline of power saving processing and logical volume migration processing.
Figure 6:
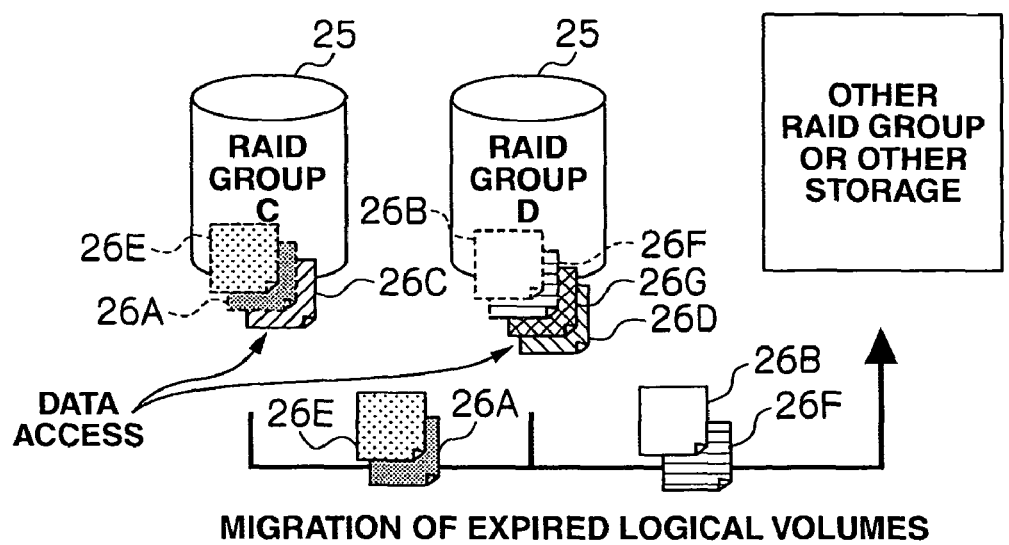
FIG. 6 is a conceptual diagram explaining the outline of power saving processing and logical volume migration processing.

FIG. 5 and FIG. 6 show a specific example representing the outline of power saving processing and logical volume migration of the storage system 1. In the present embodiment, the RAID group 23 in which the power source of the hard disk drives 22 is to be shut down for power saving as designated by the management apparatus 5 is hereinafter referred to as a "power saving target RAID group 24." The RAID group 23 that was not designated by the management apparatus 5 is hereinafter referred to as a "non-power saving target RAID group 25."

In this example, the RAID group A of the power saving target RAID group 24 stores logical volumes 26A, 26B. The RAID group B of the power saving target RAID group 24 stores logical volumes 26C, 26D. In addition, RAID group C of the non-power saving target RAID group 25 stores a logical volume 26E, and the RAID group D of the non-power saving target RAID group 25 stores logical volumes 26F, 26G. In this example, let it be assumed that the expiration date of the logical volumes 26A, 26B, 26E, 26F is the same.

In the foregoing case, when the storage apparatus 3 receives a power saving processing execution command upon the management apparatus 5 designating the power saving target RAID group 24, it migrates the logical volumes 26 stored in the power saving target RAID group 24 in order to shut down the power source of the hard disk drives 22 of the power saving target RAID group 24. Here, the storage apparatus 3 migrates the logical volumes 26 by referring to the expiration date of such logical volumes 26 and taking into consideration the migration timing of the logical volumes 26 after expiration, and thereafter shuts down the power source of the power saving target RAID group 24 (FIG. 5).

Like this, as a result of the storage apparatus 3 balancing and migrating the logical volumes 26 with the same expiration date upon taking into consideration the migration timing of the logical volumes 26 after expiration, the plurality of logical volumes 26 stored in the same RAID group 23 in a concentrated manner are migrated when their expiration date is reached, and it thereby possible to effectively prevent the hard disk drives 22 of the RAID group 23 from becoming overloaded. Consequently, it is possible to prevent the deterioration in performance such as the data access during migration of the logical volumes 26 (FIG. 6).

Specifically, the storage apparatus 3 migrates the logical volume 26A of the RAID group A to the RAID group C and migrates the logical volume 26B of the RAID group A to the RAID group D so that the logical volumes 26A, 26B, 26E, 26F are migrated to the non-power saving target RAID group 25. The storage apparatus 3 further migrates the logical volume 26C of the RAID group B to the RAID group C, migrates the logical volume 26D of the RAID group B to the RAID group D, and thereafter shuts down the power source of the RAID group A and the RAID group B.

When the expiration date of the logical volumes 26A, 26B, 26E, 26F is reached, the storage apparatus 3 is able to migrate the logical volumes 26A, 26E from the RAID group C to another RAID group or another storage apparatus, and migrates the logical volumes 26B, 26F from the RAID group D to another RAID group or another storage apparatus.

Like this, since the storage apparatus 3 is able to migrate the logical volumes 26A, 26B, 26E, 26F to the non-power saving target RAID group 25, it is possible to effectively prevent the hard disk drives 22 of the RAID groups C, D from becoming overloaded. Consequently, even when there is data access to the logical volume 26C or the logical volume 26B during the migration of the logical volumes 26, it is possible to prevent the deterioration in data access performance caused by the hard disk drives 22 becoming overloaded.

(1-3) Processing by Various Programs

Figure 7:
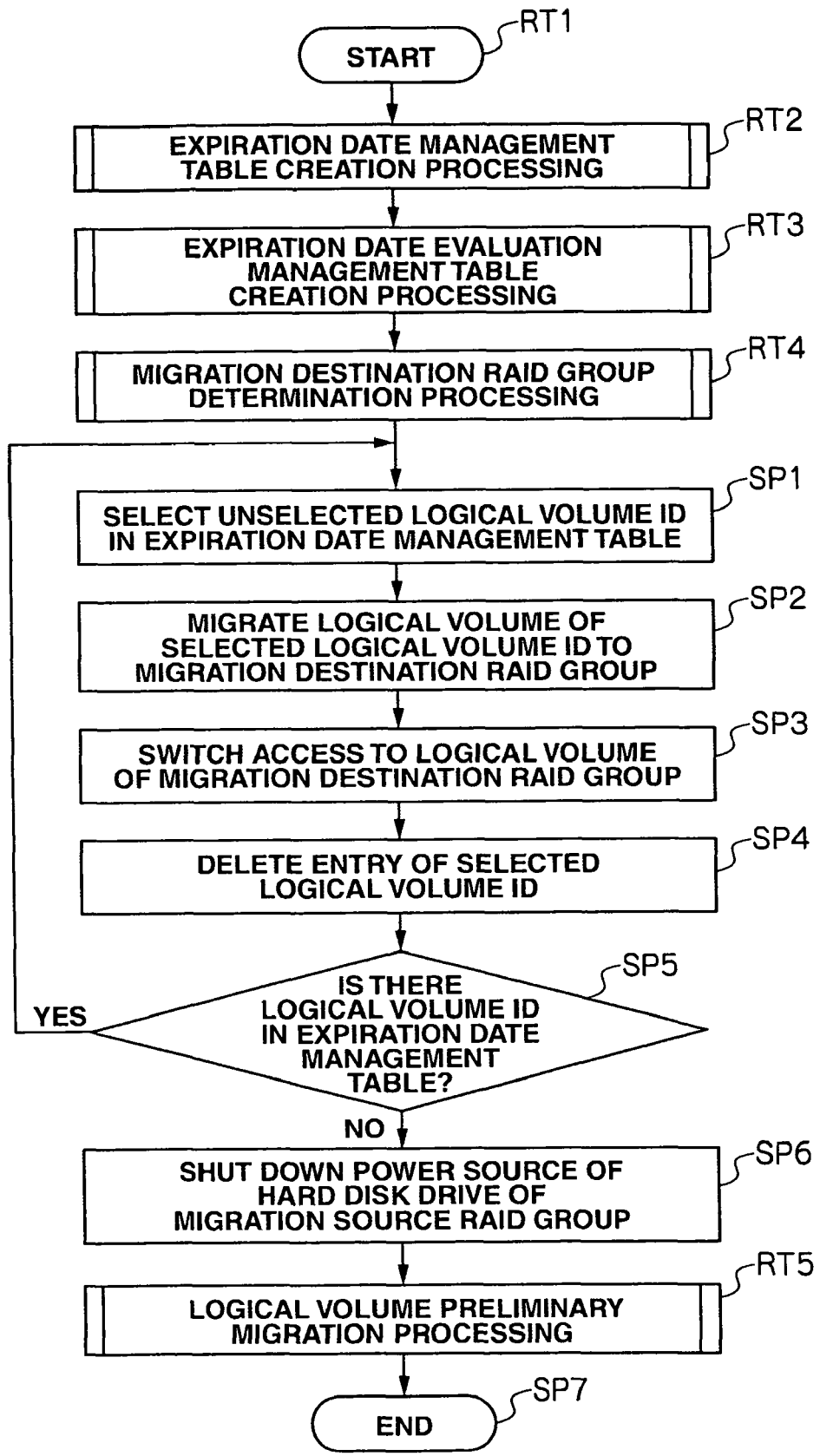
FIG. 7 is a flowchart showing a power saving processing routine.

FIG. 7 is an example of a flowchart showing a specific processing routine of the CPU 38 of the storage apparatus 3 concerning the power saving processing of the storage apparatus 3 in the storage system 1.

When the CPU 38 of the storage apparatus 3 receives a power saving processing execution command upon the management apparatus 5 designating the power saving target RAID group 24, for example, by executing the power saving program 41, it executes the expiration date management table creation processing for creating the expiration date management table 43, the expiration date evaluation management table creation processing for creating the expiration date evaluation management table 44, and the migration destination RAID group determination processing for determining the migration destination RAID group 23 to which the logical volumes 26 of the power saving target RAID group 24 are to be migrated according to the power saving processing routine RT1 shown in FIG. 7 (RT2 to RT4). Details concerning each processing will be described later.

Subsequently, the CPU 38 of the storage apparatus 3 selects an unselected logical volume ID in the created expiration date management table 43 (SP1). The CPU 38 of the storage apparatus 3 thereafter migrates the logical volume of the selected logical volume ID to the migration destination RAID group 23 (SP2).

Subsequently, the CPU 38 of the storage apparatus 3 switches the access with the host system 2 from the logical volume 26 of the migration source RAID group 23 to the logical volume 26 of the migration destination RAID group 23 (SP3). The CPU 38 of the storage apparatus 3 thereafter deletes the entry of the selected logical volume ID from the expiration date management table 43 (SP4).

Subsequently, the CPU 38 of the storage apparatus 3 checks whether there is a logical volume ID in the expiration date management table 43 (SP5). If there is a logical volume ID in the expiration date management table 43 (SP5: YES), the CPU 38 of the storage apparatus 3 returns to step SP1, once again selects an unselected logical volume ID in the created expiration date management table 43, and thereafter repeats the same processing as in the case described above (SP1 to SP5). Meanwhile, if there is no logical volume ID in the expiration date management table 43 (SP5: NO), since this means that all logical volumes 26 have been migrated, the CPU 38 of the storage apparatus 3 shuts down the power source of the hard disk drives 22 of the migration source RAID group 23 (power saving target RAID group 24) (SP6).

Subsequently, the CPU 38 of the storage apparatus 3 executes the logical volume preliminary migration processing for preliminarily migrating the logical volume 26 to the RAID group 23, to which logical volumes are to be migrated after expiration, before the expiration date of the migrated logical volume 26 is reached (RT5). Details concerning the logical volume preliminary migration processing will be described later.

The CPU 38 of the storage apparatus 3 eventually ends the power saving processing routine RT1 shown in FIG. 7 (SP7).

Figure 8:
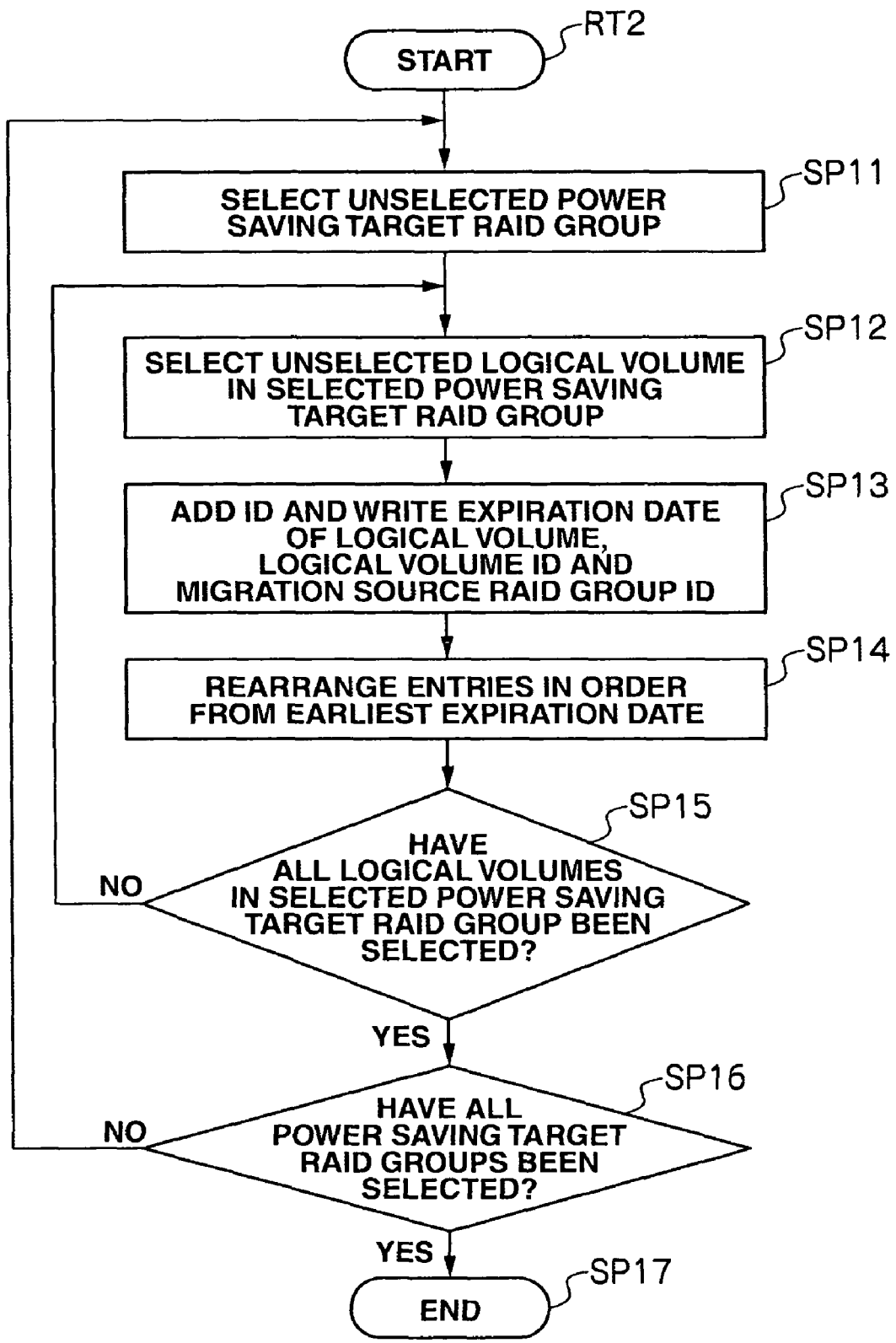
FIG. 8 is a flowchart showing an expiration date management table creation processing routine.

FIG. 8 is an example of a flowchart showing a specific processing routine of the CPU 38 of the storage apparatus 3 concerning the expiration date management table creation processing in the power saving processing routine of the storage apparatus 3 in the storage system 1. A specific example of this processing will be explained later with reference to FIG. 9.

When the CPU 38 of the storage apparatus 3 executes the power saving program 41, it selects an unselected power saving target RAID group 24 among the RAID groups 23 in the storage apparatus 3 according to the expiration date management table creation processing routine RT2 shown in FIG. 8 (SP11).

Subsequently, the CPU 38 of the storage apparatus 3 selects an unselected logical volume 26 among the logical volumes 26 in the selected power saving target RAID group 24 (SP12).

Subsequently, the CPU 38 of the storage apparatus 3 adds an identification ID in numerical sequence to the identification ID column 43A of the expiration date management table 43, and writes the expiration date of the selected logical volume 26, the logical volume ID of the logical volume, and the migration source RAID group ID currently storing the logical volume 26 in the expiration date column 43B, the logical volume ID column 43C and the migration source RAID disk ID column 43D in the entries of the identification ID (SP13).

Subsequently, the CPU 38 of the storage apparatus 3 rearranges the entries in order from the earliest expiration date (SP14).

Subsequently, the CPU 38 of the storage apparatus 3 checks whether all logical volumes 26 in the selected power saving target RAID group 24 have been selected (SP15). If all logical volumes 26 in the selected power saving target RAID group 24 have not been selected (SP15: NO), the CPU 38 of the storage apparatus 3 returns to step SP12, once again selects an unselected logical volume 26 among the logical volumes 26 in the selected power saving target RAID group 24, and thereafter repeats the same processing as in the case described above (SP12 to SP15).

Meanwhile, if all logical volumes 26 in the selected power saving target RAID group 24 have been selected (SP15: YES), the CPU 38 of the storage apparatus 3 checks whether all power saving target RAID groups 24 in the storage apparatus 3 have been selected (SP16). If all power saving target RAID groups 24 in the storage apparatus 3 have not been selected (SP16: NO), the CPU 38 of the storage apparatus 3 returns to step SP11, once again selects an unselected power saving target RAID group 24 among the RAID groups 23 in the storage apparatus 3, and thereafter repeats the same processing as in the case described above (SP11 to SP16).

Meanwhile, if all power saving target RAID groups 24 in the storage apparatus 3 have been selected (SP16: YES), the CPU 38 of the storage apparatus 3 thereafter ends the expiration date management table creation processing routine RT2 shown in FIG. 8 (SP17).

FIG. 9 shows a specific example of the expiration date management table creation processing in the power saving processing routine of the storage apparatus 3 in the storage system 1. In this example, the storage apparatus 3 includes RAID groups A to E. The RAID group A and the RAID group B are power saving target RAID groups 24. The RAID group C, the RAID group D and the RAID group E are non-power saving target RAID groups 25.

The RAID group A stores a logical volume 26H having an expiration date of "Time-1," a logical volume 26I having an expiration date of "Time-2," a logical volume 26J having an expiration date of "Time-3," and a logical volume 26K having an expiration date of "Time-4." The RAID group B stores a logical volume 26L having an expiration date of "Time-1," and a logical volume 26M having an expiration date of "Time-5." The RAID group C stores a logical volume 26N having an expiration date of "Time-1," and a logical volume 26O having an expiration date of "Time-2." The RAID group D stores a logical volume 26P having an expiration date of "Time-1," a logical volume 26Q having an expiration date of "Time-3," and a logical volume 26W having an expiration date of "Time-4." The RAID group E stores a logical volume 26S having an expiration date of "Time-1.5," and a logical volume 26T having an expiration date of "Time-3."

With respect to the expiration dates, let it be assumed that the expiration dates arrive early in the order of "Time-1," "Time-1.5," "Time-2," "Time-3," "Time-4," and "Time-5."

Foremost, the expiration date management table 43 is not managing anything in the initial status (#1).

Here, when the CPU 38 of the storage apparatus 3 executes the power saving program 41, for instance, it selects the RAID group A (SP11), and thereafter selects the logical volume 26H in the RAID group A (SP12). Next, the CPU 38 of the storage apparatus 3 adds the identification ID "1" to the identification ID column 43A, and writes the expiration date "Time-1," the logical volume ID of the logical volume 26H, and the RAID group ID of the RAID group A in the expiration date column 43B, the logical volume ID column 43C and the migration source RAID disk ID column 43D in the entries of the identification ID "1" (SP13) (#2).

Subsequently, since all logical volumes 26 in the RAID group A have not been selected (SP15: NO), the CPU 38 of the storage apparatus 3 returns to step SP12, and selects the logical volume 26H in the RAID group A (SP13). Next, the CPU 38 of the storage apparatus 3 adds the ID "2" to the identification ID column 43A, and writes the expiration date "Time-2," the logical volume ID of the logical volume 26I, and the RAID group ID of the RAID group A in the expiration date column 43B, the logical volume ID column 43C, and the migration source RAID disk ID column 43D in the entries of the ID "2" (SP13) (#3).

Subsequently, by executing the same processing as in the case described above, the CPU 38 of the storage apparatus 3 adds the ID "3" and the ID "4" to the identification ID column 43A, and writes the expiration date "Time-3," the logical volume ID of the logical volume 26J, and the RAID group ID of the RAID group A, as well as the expiration date "Time-4," the logical volume ID of the logical volume 26K, and the RAID group ID of the RAID group A (SP13). Next, since all logical volumes 26 in the RAID group A have been selected (SP15: YES), but all power saving target RAID groups 24 in the storage apparatus 3 have not been selected (SP16: NO), the CPU 38 of the storage apparatus 3 selects the RAID group B (SP11), and thereafter selects the logical volume 26L in the RAID group B (SP12). Next, the CPU 38 of the storage apparatus 3 adds the ID "5" to the identification ID column 43A, and writes the expiration date "Time-1," the logical volume ID of the logical volume 26L, and the RAID group ID of the RAID group A in the expiration date column 43B, the logical volume ID column 43C, and the migration source RAID disk ID column 43D in the entries of the ID "5" (SP13).

Subsequently, the CPU 38 of the storage apparatus 3 rearranges the entries in order from the earliest expiration date (SP14). In other words, since the expiration date of the logical volume 26L in the entries of the identification ID "5" is "Time-1," the CPU 38 of the storage apparatus 3 rearranges the entry of the identification ID "5" to the upper row of the entry of the ID "2" (SP14).

Subsequently, since all logical volumes 26 in the RAID group B have not been selected (SP15: NO), the CPU 38 of the storage apparatus 3 returns to step SP12, and selects the logical volume 26M in the RAID group B (SP13). Next, the CPU 38 of the storage apparatus 3 adds the ID "6" to the identification ID column 43A, and writes the expiration date "Time-5," the logical volume ID of the logical volume 26M, and the RAID group ID of the RAID group A in the expiration date column 43B, the logical volume ID column 43C, and the migration source RAID disk ID column 43D in the entries of the ID "6" (SP13) (#4).

Since all logical volumes 26 in the RAID group A have been selected (SP15: YES), and all power saving target RAID groups 24 in the storage apparatus 3 have been selected (SP16: YES), the CPU 38 of the storage apparatus 3 thereafter ends the expiration date management table creation processing routine RT2 (SP17). The CPU 38 of the storage apparatus 3 creates the expiration date management table 43 as described above.

Figure 10:
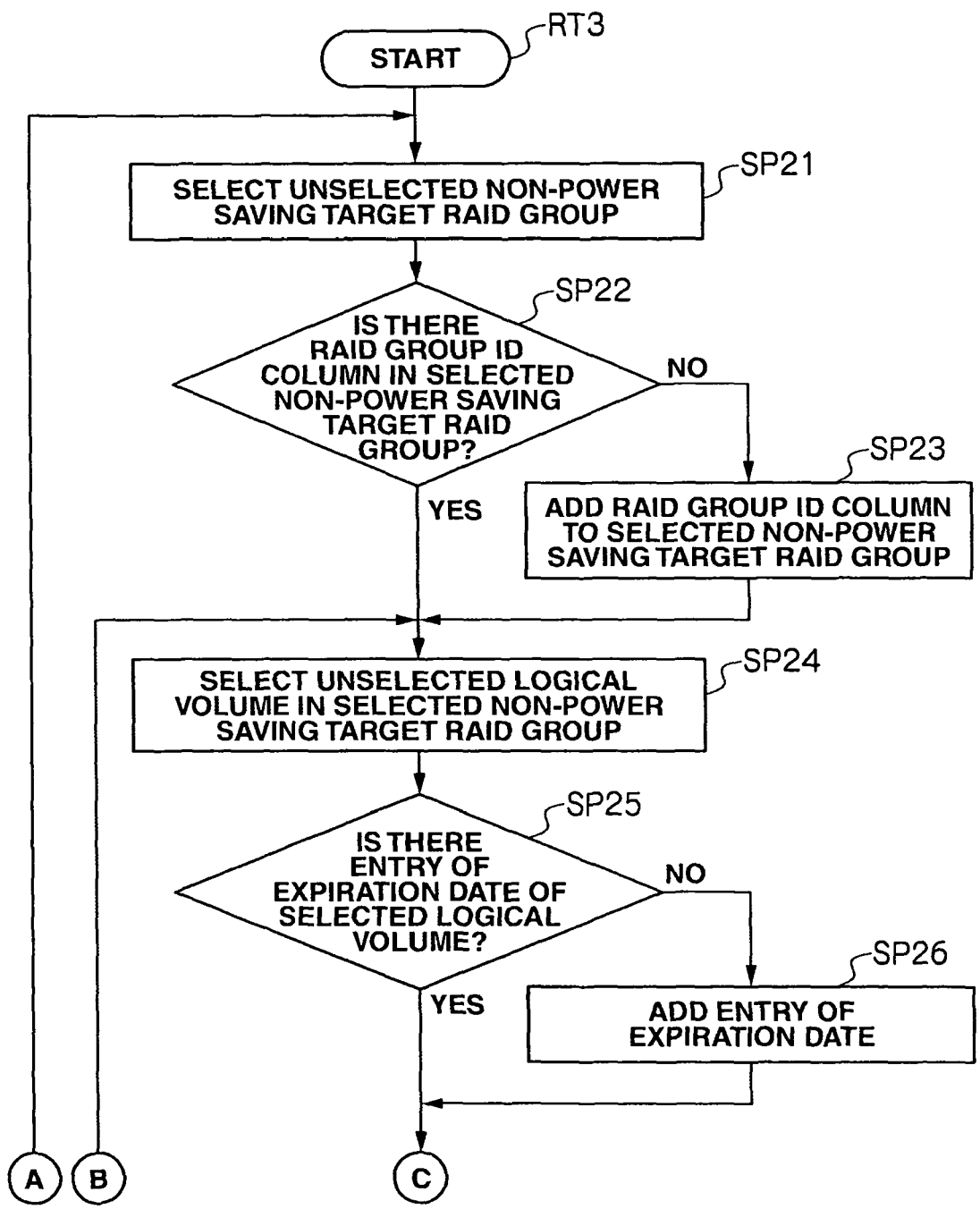
FIG. 10 is a flowchart showing an expiration date evaluation management table creation processing routine.
Figure 11:
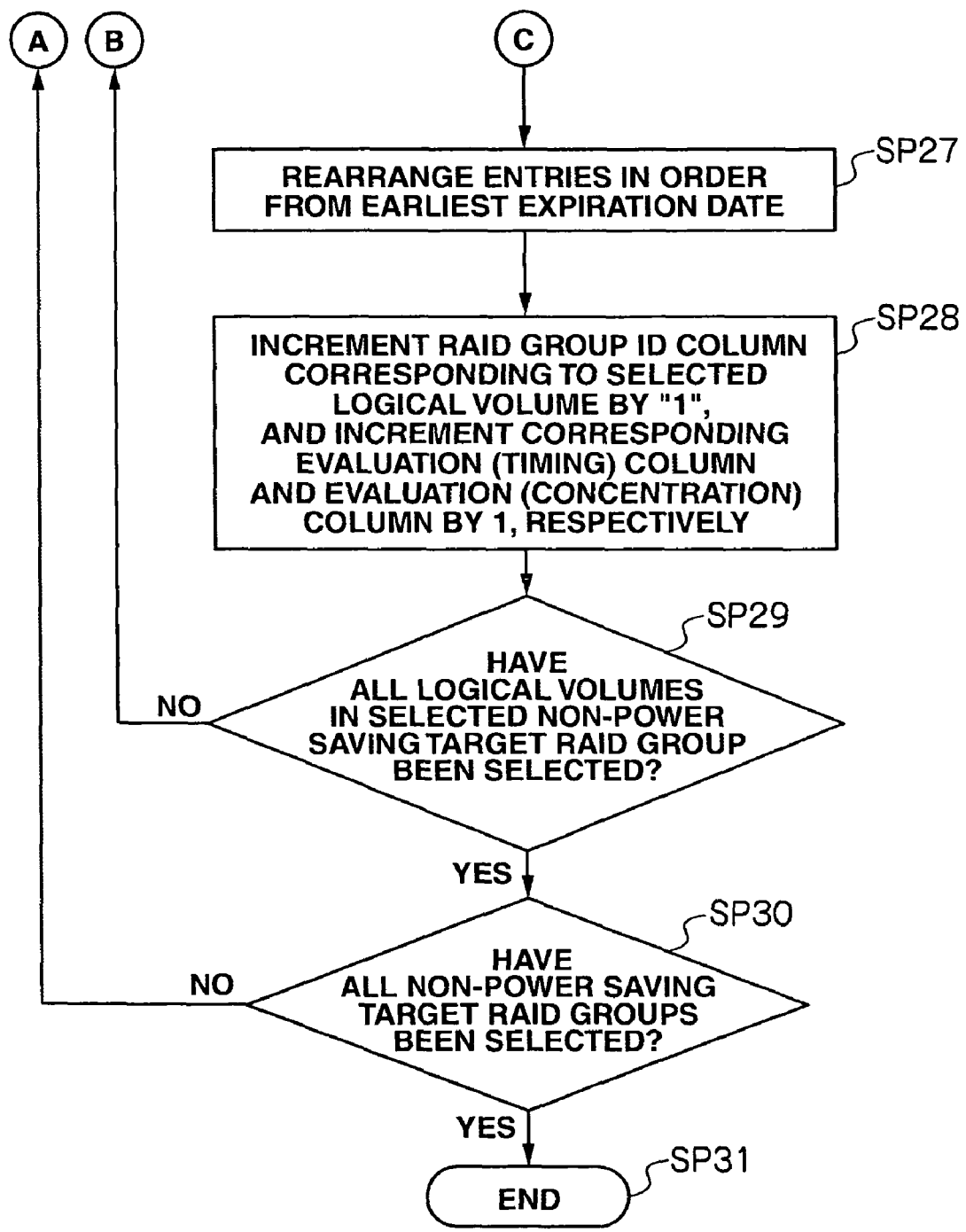
FIG. 11 is a flowchart showing an expiration date evaluation management table creation processing routine.

FIG. 10 and FIG. 11 are an example of a flowchart showing a specific processing routine of the CPU 38 of the storage apparatus 3 concerning the expiration date evaluation management table creation processing in the power saving processing routine of the storage apparatus 3 in the storage system 1. A specific example of this processing will be explained later with reference to FIG. 12 to FIG. 14.

When the CPU 38 of the storage apparatus 3 ends the expiration date management table creation processing (RT2), it selects an unselected non-power saving target RAID group 25 among the RAID groups 23 in the storage apparatus 3 according to the expiration date evaluation management table creation processing routine RT3 shown in FIG. 10 and FIG. 11 (SP21).

Subsequently, the CPU 38 of the storage apparatus 3 checks whether there is a RAID group ID column of the selected non-power saving target RAID group 25 in the expiration date evaluation management table 44 (SP22). If there is a RAID group ID column of the selected non-power saving target RAID group 25 in the expiration date evaluation management table 44 (SP22: YES), the CPU 38 of the storage apparatus 3 proceeds to step SP24. Meanwhile, if there is no RAID group ID column of the selected non-power saving target RAID group 25 in the expiration date evaluation management table 44 (SP22: NO), the CPU 38 of the storage apparatus 3 adds the RAID group ID column of the selected non-power saving target RAID group 25 to the corresponding RAID group ID column 44C (SP23).

The CPU 38 of the storage apparatus 3 eventually selects an unselected logical volume 26 among the logical volumes 26 in the non-power saving target RAID group 25 (SP24).

Subsequently, the CPU 38 of the storage apparatus 3 checks whether there is an entry of the expiration date of the selected logical volume 26 in the expiration date evaluation management table 44 (SP25). If there is an entry of the expiration date of the selected logical volume 26 in the expiration date evaluation management table 44 (SP25: YES), the CPU 38 of the storage apparatus 3 proceeds to step SP27. Meanwhile, if there is no entry of the expiration date of the selected logical volume 26 in the expiration date evaluation management table 44 (SP25: NO), the CPU 38 of the storage apparatus 3 adds an identification ID in numerical sequence to the identification ID column 44A of the expiration date evaluation management table 44, and adds an entry of the expiration date by writing the expiration date of the selected logical volume 26 in the expiration date column 44B of the entry of the identification ID (SP26). Regardless of whether this is indicated as an entry of the identification ID or an entry of the expiration date, it will be the same entry if the identification ID and the expiration date are indicated horizontally.

The CPU 38 of the storage apparatus 3 eventually rearranges the entries in order from the earliest expiration date (SP27).

Subsequently, the CPU 38 of the storage apparatus 3 increments the RAID group ID column of the RAID group 23 storing the selected logical volume 26 in the entry of the expiration date of the selected logical volume 26 by "1," and increments the corresponding evaluation (timing) column 44D and evaluation (concentration) column 44E by "1" (SP28).

Subsequently, the CPU 38 of the storage apparatus 3 checks whether all logical volumes 26 in the selected non-power saving target RAID group 25 have been selected (SP29). If all logical volumes 26 in the selected non-power saving target RAID group 25 have not been selected (SP29: NO), the CPU 38 of the storage apparatus 3 returns to step SP24, once again selects an unselected logical volume 26 among the logical volumes 26 in the selected non-power saving target RAID group 25, and thereafter repeats the same processing as in the case described above (SP24 to SP29).

Meanwhile, if all logical volumes 26 in the selected non-power saving target RAID group 25 have been selected (SP29: YES), the CPU 38 of the storage apparatus 3 checks whether all non-power saving target RAID groups 25 in the storage apparatus 3 have been selected (SP30). If all non-power saving target RAID groups 25 in the storage apparatus 3 have not been selected (SP30: NO), the CPU 38 of the storage apparatus 3 returns to step SP21, once again selects an unselected non-power saving target RAID group 25 in the storage apparatus 3, and thereafter repeats the same processing as in the case described above (SP21 to SP30).

Meanwhile, if all non-power saving target RAID groups 25 in the storage apparatus 3 have been selected (SP30: YES), the CPU 38 of the storage apparatus 3 thereafter ends the expiration date evaluation management table creation processing routine RT3 shown in FIG. 10 and FIG. 11 (SP31).

Figure 12:
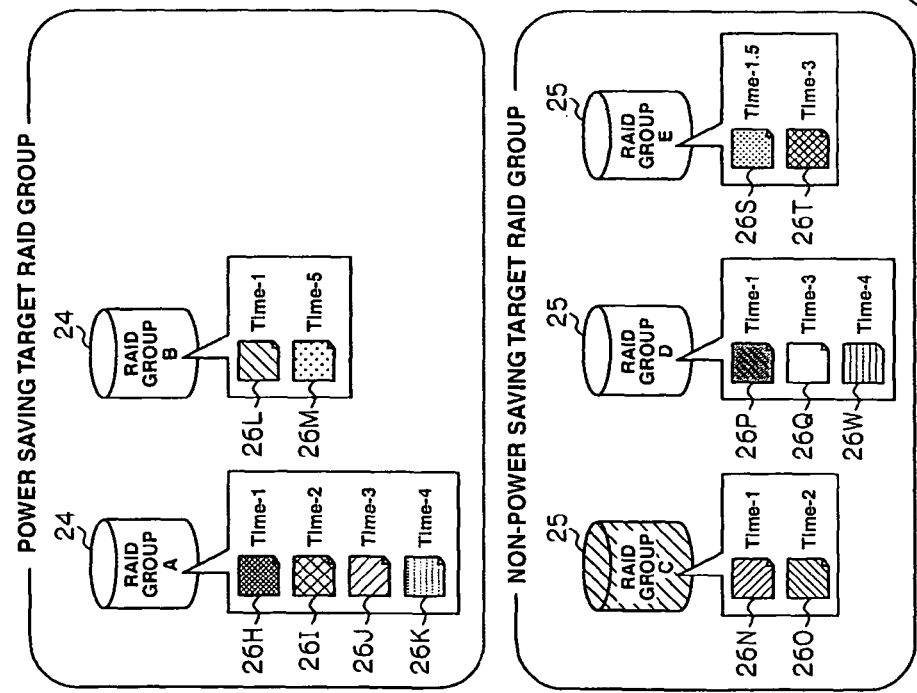
FIG. 12 is a conceptual diagram explaining expiration date evaluation management table creation processing.
Figure 13:
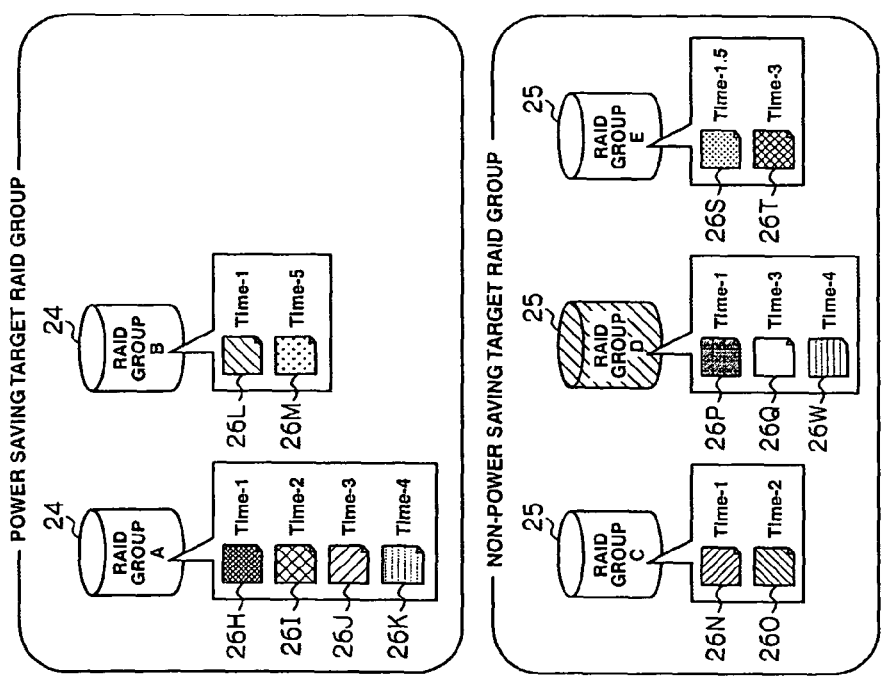
FIG. 13 is a conceptual diagram explaining expiration date evaluation management table creation processing.
Figure 14:
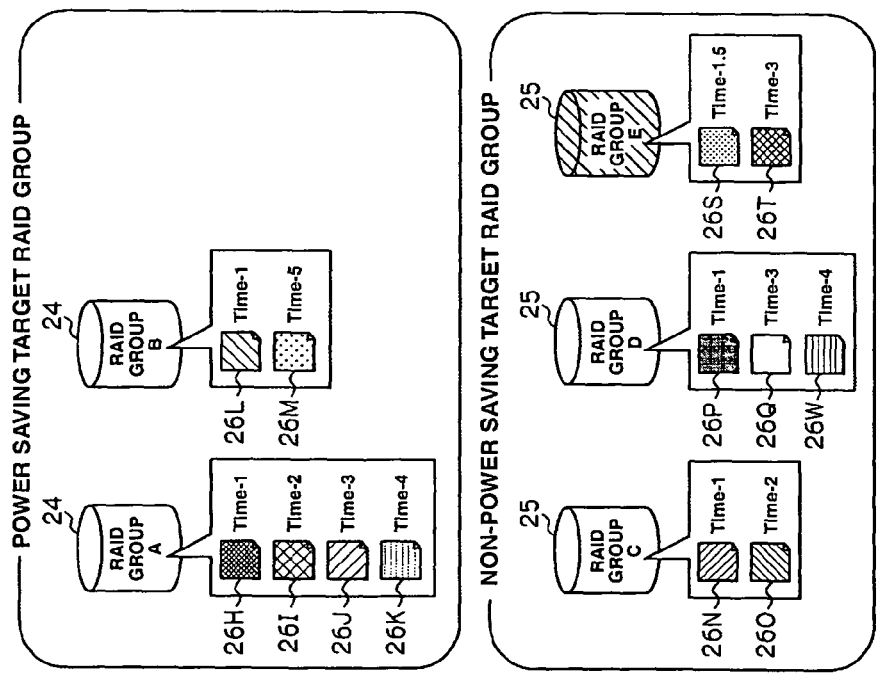
FIG. 14 is a conceptual diagram explaining expiration date evaluation management table creation processing.

FIG. 12 to FIG. 14 show a specific example of the expiration date evaluation management table creation processing in the power saving processing routine of the storage apparatus 3 in the storage system 1. The configuration of the RAID group 23 and the logical volume 26 in this example is the same as in the case explained with reference to FIG. 9.

Foremost, the expiration date evaluation management table 44 is not managing anything in the initial status (#1).

Here, when the CPU 38 of the storage apparatus 3 ends the expiration date management table creation processing (RT2), for instance, it selects the RAID group A (SP21) and, since there is a RAID group ID column of the RAID group C in the expiration date evaluation management table 44 (SP22: YES), thereafter selects the logical volume 26N in the RAID group C (SP24).

Next, since the expiration date "Time-1" of the logical volume 26N does not exist in the expiration date evaluation management table 44 (SP25: NO), the CPU 38 of the storage apparatus 3 adds the ID "1" to the identification ID column 44A, and adds an entry of the expiration date "Time-1" by writing the expiration date "Time-1" in the expiration date column 43B in the entry of the ID "1" (SP26). Next, the CPU 38 of the storage apparatus 3 increments the RAID group ID column of the RAID group C in the entry of the expiration date "Time-1" from "0" to "1," increments the evaluation (timing) column 44D in the entry of the expiration date "Time-1" from "0" to "1," and increments the evaluation (concentration) column 44E in the RAID group ID column of the RAID group C from "0" to "1" (SP28) (#2).

Next, since all logical volumes 26 in the RAID group C have not been selected (SP29: NO), the CPU 38 of the storage apparatus 3 returns to step SP24, and selects the logical volume 26O in the RAID group A (SP24). Next, since the expiration date "Time-2" of the logical volume 26O does not exist in the expiration date evaluation management table 44 (SP25: NO), the CPU 38 of the storage apparatus 3 adds the ID "2" to the identification ID column 44A, and adds an entry of the expiration date "Time-2" by writing the expiration date "Time-2" in the expiration date column 44B in the entry of the ID "2" (SP26). Next, the CPU 38 of the storage apparatus 3 increments the RAID group ID column of the RAID group C in the entry of the expiration date "Time-2" from "0" to "1," increments the evaluation (timing) column 44D in the entry of the expiration date "Time-1" from "0" to "1," and increments the evaluation (concentration) column 44E in the RAID group ID column of the RAID group C from "1" to "2" (SP28) (#3).

Next, since all logical volumes 26 in the RAID group C have been selected (SP29: YES), but all non-power saving target RAID groups 25 in the storage apparatus 3 have not been selected (SP30: NO), the CPU 38 of the storage apparatus 3 selects the RAID group D (SP21), and, since there is a RAID group ID column of the RAID group D in the expiration date evaluation management table 44 (SP22: YES), thereafter selects the logical volume 26P in the RAID group D (SP24). Next, since the expiration date "Time-1" of the logical volume 26N exists in the expiration date evaluation management table 44 (SP25: YES), the CPU 38 of the storage apparatus 3 increments the RAID group ID column of the RAID group D in the entry of the expiration date "Time-1" from "0" to "1," increments the evaluation (timing) column 44D in the entry of the expiration date "Time-1" from "1" to "2," and increments the evaluation (concentration) column 44E in the RAID group ID column of the RAID group D from "0" to "1" (SP28) (#4).

Next, since all logical volumes 26 in the RAID group D have not been selected (SP29: NO), the CPU 38 of the storage apparatus 3 returns to step SP24, and selects the logical volume 26Q in the RAID group D (SP24). Next, since the expiration date "Time-3" of the logical volume 26Q does not exist in the expiration date evaluation management table 44 (SP25: NO), the CPU 38 of the storage apparatus 3 adds the ID "3" to the identification ID column 44A, and adds an entry of the expiration date "Time-3" by writing the expiration date "Time-3" in the expiration date column 43B in the entry of the ID "3" (SP26). Next, the CPU 38 of the storage apparatus 3 increments the RAID group ID column of the RAID group D in the entry of the expiration date "Time-3" from "0" to "1," increments the evaluation (timing) column 44D in the entry of the expiration date "Time-1" from "0" to "1," and increments the evaluation (concentration) column 44E in the RAID group ID column of the RAID group C from "1" to "2" (SP28) (#5).

Next, since the all logical volumes 26 in the RAID group D have not been selected (SP29: NO), the CPU 38 of the storage apparatus 3 returns to step SP24, and selects the logical volume 26W in the RAID group D (SP24). Next, since the expiration date "Time-4" of the logical volume 26W does not exist in the expiration date evaluation management table 44 (SP25: NO), the CPU 38 of the storage apparatus 3 adds the ID "4" to the identification ID column 44A, and adds an entry of the expiration date "Time-4" by writing the expiration date "Time-4" in the expiration date column 43B in the entry of the ID "4" (SP26). Next, the CPU 38 of the storage apparatus 3 increments the RAID group ID column of the RAID group D in the entry of the expiration date "Time-4" from "0" from "1," increments the evaluation (timing) column 44D in the entry of the expiration date "Time-1" from "0" to "1," and increments the evaluation (concentration) column 44E in the RAID group ID column of the RAID group C from "2" to "3" (SP28) (#6).

Next, since all logical volumes 26 in the RAID group D have been selected (SP29: YES), but all non-power saving target RAID groups 25 in the storage apparatus 3 have not been selected (SP30: NO), the CPU 38 of the storage apparatus 3 selects the RAID group E (SP21), and, since there is a RAID group ID column of the RAID group E in the expiration date evaluation management table 44 (SP22: YES), thereafter selects the logical volume 26S in the RAID group E (SP24). Next, since the expiration date "Time-1.5" of the logical volume 26W does not exist in the expiration date evaluation management table 44 (SP25: NO), the CPU 38 of the storage apparatus 3 adds the ID "5" to the identification ID column 44A, and adds an entry of the expiration date "Time-1.5" by writing the expiration date "Time-1.5" in the expiration date column 43B in the entry of the ID "5" (SP26). Next, the CPU 38 of the storage apparatus 3 rearranges the entry having the expiration date of "Time-1.5" to the upper row of the entry of the expiration date "Time-2" (SP27). Next, the CPU 38 of the storage apparatus 3 increments the RAID group ID column of the RAID group D in the entry of the expiration date "Time-1.5" from "0" to "1," increments the evaluation (timing) column 44D in the entry of the expiration date "Time-1.5" from "0" to "1," and increments the evaluation (concentration) column 44E in the RAID group ID column of the RAID group C from "0" to "1" (SP28) (#7).

Next, since all logical volumes 26 in the RAID group E have not been selected (SP29: NO), the CPU 38 of the storage apparatus 3 returns to step SP24, and selects the logical volume 26T in the RAID group E (SP24). Next, since the expiration date "Time-3" of the logical volume 26T exists in the expiration date evaluation management table 44 (SP25: YES), the CPU 38 of the storage apparatus 3 increments the RAID group ID column of the RAID group E in the entry of the expiration date "Time-3" from "0" to "1," increments the evaluation (timing) column 44D in the entry of the expiration date "Time-1" from "1" to "2," and increments the evaluation (concentration) column 44E in the RAID group ID column of the RAID group D from "1" to "2" (SP28) (#8).

Finally, since all logical volumes 26 in the RAID group E have been selected (SP29: YES), and all non-power saving target RAID groups 25 in the storage apparatus 3 have been selected (SP30: YES), the CPU 38 of the storage apparatus 3 thereafter ends the expiration date evaluation management table creation processing routine RT3 (SP31). The CPU 38 of the storage apparatus 3 creates the expiration date evaluation management table 44 as described above.

Figure 15:
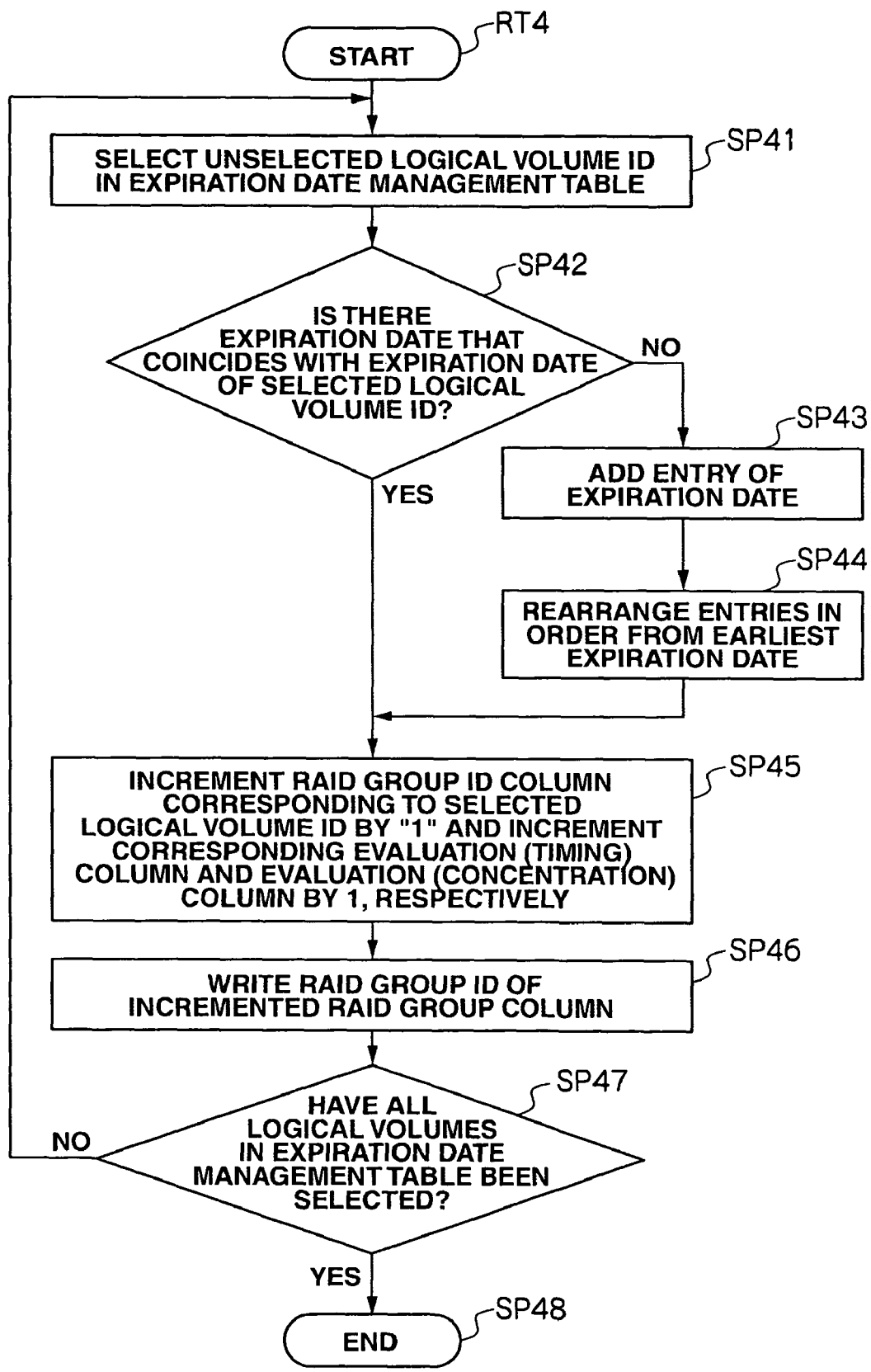
FIG. 15 is a flowchart showing a migration destination RAID group determination processing routine.

FIG. 15 is an example of a flowchart showing a specific processing routine of the CPU 38 of the storage apparatus 3 concerning the migration destination RAID group determination processing in the power saving processing routine of the storage apparatus 3 in the storage system 1. A specific example of this processing will be described later with reference to FIG. 16 to FIG. 18.

When the CPU 38 of the storage apparatus 3 ends the expiration date evaluation management table creation processing (RT3), it selects an unselected logical volume ID among the logical volume IDs of the logical volumes 26 in the expiration date management table 43 according to the migration destination RAID group determination processing routine RT4 shown in FIG. 15 (SP41).

Subsequently, the CPU 38 of the storage apparatus 3 checks whether there is an entry of an expiration date that coincides with the expiration date of the selected logical volume ID in the expiration date evaluation management table 44 (SP42). If there is an entry of an expiration date that coincides with the expiration date of the selected logical volume ID in the expiration date evaluation management table 44 (SP42: YES), the CPU 38 of the storage apparatus 3 proceeds to step SP45. Meanwhile, if there is no entry of an expiration date that coincides with the expiration date of the selected logical volume ID in the expiration date evaluation management table 44 (SP42: NO), the CPU 38 of the storage apparatus 3 adds an identification ID in numerical sequence to the identification ID column 44A of the expiration date evaluation management table 44, and adds an entry of the expiration date by writing the expiration data of the entry of the selected logical volume ID in the expiration date column 44B of the entry of the identification ID (SP43).

Subsequently, the CPU 38 of the storage apparatus 3 rearranges the entries in order from the earliest expiration date (SP44).

The CPU 38 of the storage apparatus 3 eventually increments the RAID group ID column of the RAID group 23 to become the migration destination of the logical volume 26 of the selected logical volume ID in the entry of the expiration date of the expiration date evaluation management table 44 by "1," and increments the corresponding evaluation (timing) column 44D and evaluation (concentration) column 44E by "1" (SP45).

Figure 16:
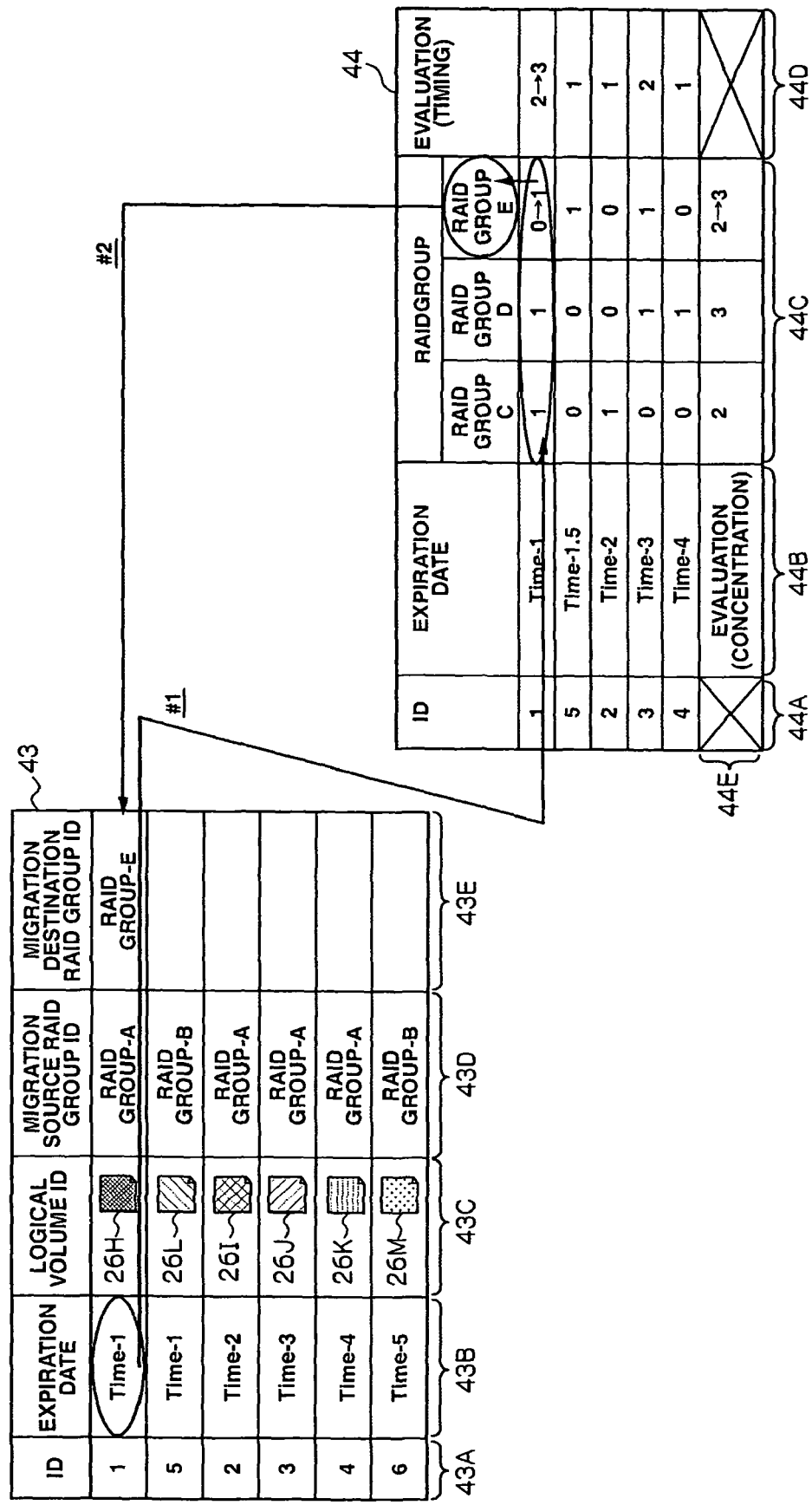
FIG. 16 is a conceptual diagram explaining migration destination RAID group determination processing.
Figure 17:
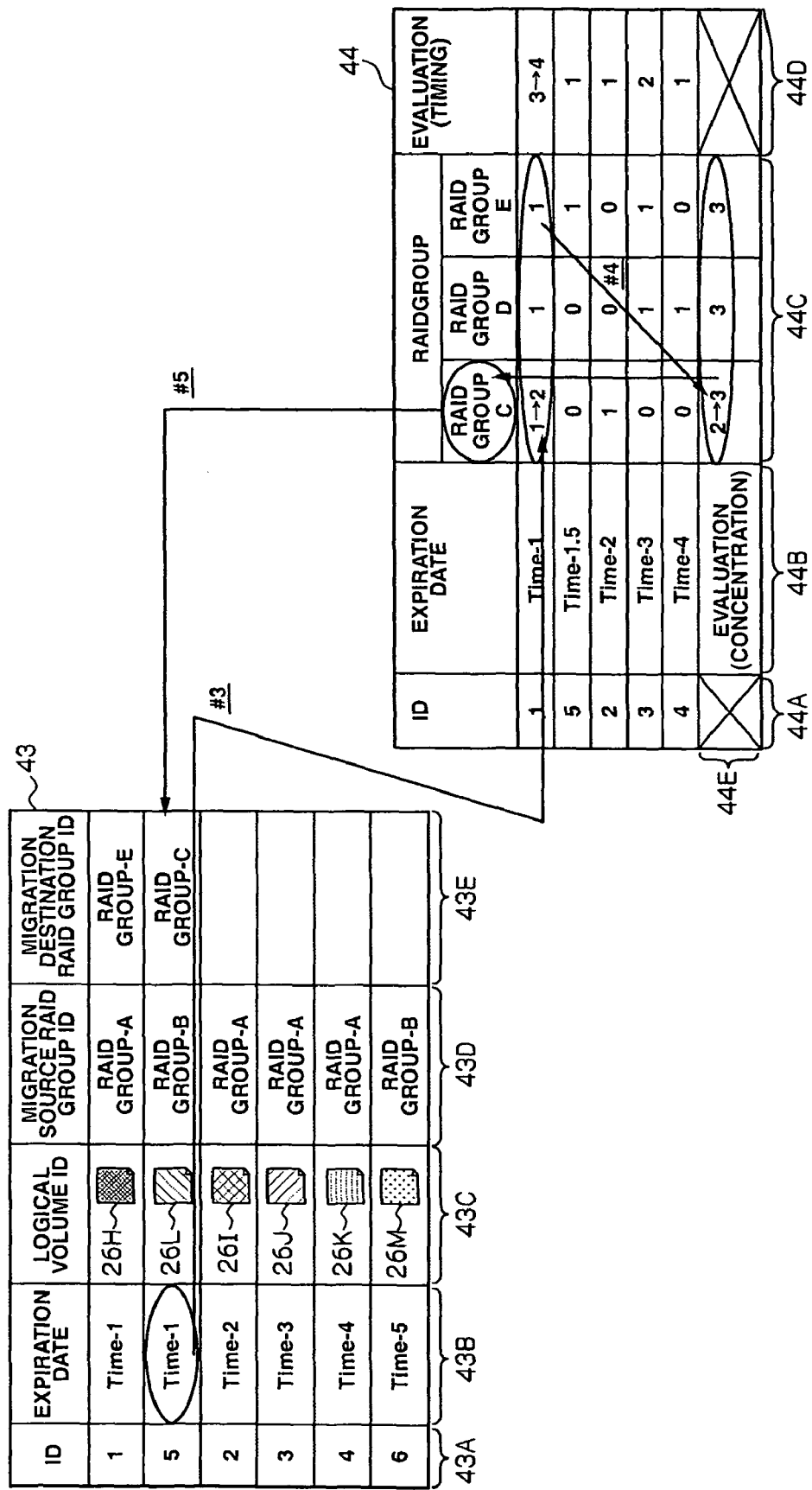
FIG. 17 is a conceptual diagram explaining migration destination RAID group determination processing.

Specifically, when there is a RAID group ID column in which the numerical value among the respective RAID group ID columns in the entry of the expiration date of the expiration date evaluation management table 44 is "0," the CPU 38 of the storage apparatus 3 increments such RAID group ID column by "1," and sets this as the migration destination RAID group 23. Meanwhile, when there is no RAID group ID column in which the numerical value among the respective RAID group ID columns in the entry of the expiration date of the expiration date evaluation management table 44 is "0," the CPU 38 of the storage apparatus 3 increments the RAID group ID column with the lowest numerical value among the respective RAID group ID columns by "1," and sets this as the migration destination RAID group 23 (FIG. 16). In addition, when all numerical values of the respective RAID group ID columns in the entry of the expiration date of the expiration date evaluation management table 44 are the same, the CPU 38 of the storage apparatus 3 refers to the evaluation (concentration) column 44E in the respective RAID group ID columns, increments the RAID group ID column of the evaluation (concentration) column 44E with the lowest numerical value by "1," and sets this as the migration destination RAID group 23 (FIG. 17). If all numerical values of the evaluation (concentration) column 44E in the respective RAID group ID columns are also the same, the evaluation (concentration) columns 44E in one of the RAID group ID columns among the evaluation (concentration) columns 44E in the RAID group ID columns with the same numerical value is incremented by "1" according to various methods.

Subsequently, the CPU 38 of the storage apparatus 3 writes the RAID group ID of the incremented RAID group ID column in the entry of the selected logical volume ID of the expiration date management table 43 (SP46).

Subsequently, the CPU 38 of the storage apparatus 3 checks whether all logical volume IDs in the expiration date management table 43 have been selected (SP47). If all logical volume IDs in the expiration date management table 43 have not been selected (SP47: NO), the CPU 38 of the storage apparatus 3 returns to step SP41, once again selects an unselected logical volume ID among the logical volume IDs of the logical volumes 26 in the expiration date management table 43, and thereafter repeats the same processing as in the case described above (SP41 to SP47). Meanwhile, if all logical volume IDs in the expiration date management table 43 have been selected (SP47: YES), the CPU 38 of the storage apparatus 3 thereafter ends the migration destination RAID group determination processing routine RT4 shown in FIG. 15 (SP47).

Figure 18:
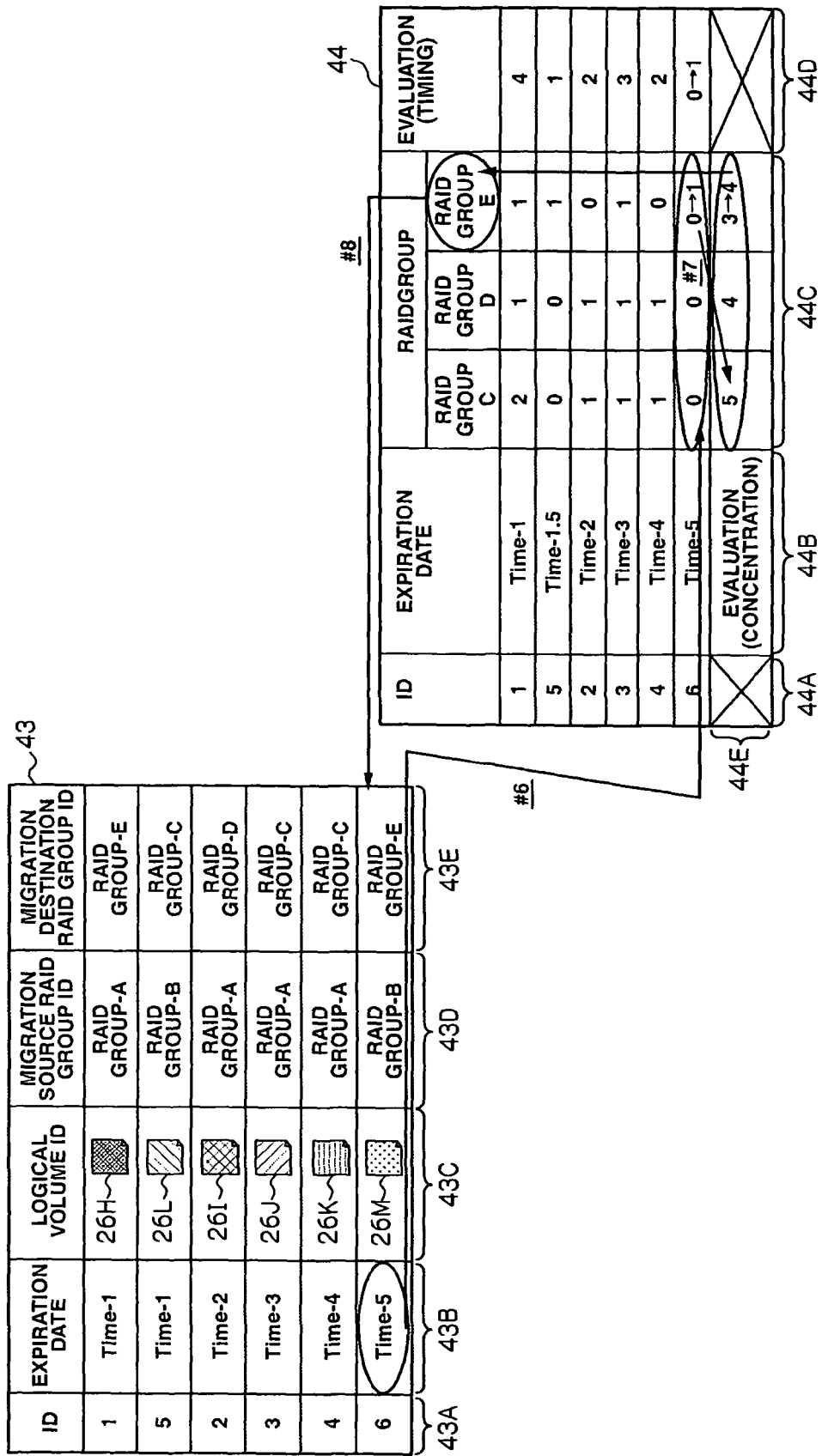
FIG. 18 is a conceptual diagram explaining migration destination RAID group determination processing.

FIG. 16 to FIG. 18 show a specific example of the migration destination RAID volume determination processing in the power saving processing routine of the storage apparatus 3 in the storage system 1. The configuration of the RAID group 23 and the logical volume 26 in this example is the same as in the case explained with reference to FIG. 9.

Here, when the CPU 38 of the storage apparatus 3 ends the expiration date evaluation management table creation processing (RT3), for instance, it selects the logical volume ID of the logical volume 26H in the expiration date management table 43 (SP41), and checks whether the expiration date "Time-1" of the logical volume 26H exists in the expiration date evaluation management table 44 (SP42) (#1).

Next, since the expiration date "Time-1" exists in the expiration date evaluation management table 44 (SP42: YES), and the RAID group ID column of the RAID group 23C is "1," the RAID group ID column of the RAID group 23D is "1" and the RAID group ID column of the RAID group 23E is "0" in the entry of the expiration date "Time-1" of the expiration date evaluation management table 44, the CPU 38 of the storage apparatus 3 increments the RAID group ID column of the RAID group 23E from "0" to "1," increments the evaluation (timing) column 44D in the entry of the expiration date "Time-1" from "2" to "3," and increments the evaluation (concentration) column 44E in the RAID group ID column of the RAID group E from "2" to "3" (SP45). Next, the CPU 38 of the storage apparatus 3 writes the RAID group ID of the RAID group 23E column in the entry of the logical volume ID of the logical volume 26H in the expiration date management table 43 (SP46) (#2).

Next, since all logical volume IDs in the expiration date management table 43 have not been selected (SP47: NO), the CPU 38 of the storage apparatus 3 returns to step SP41, selects the logical volume ID of the logical volume 26L in the expiration date management table 43 (SP41), and checks whether the expiration date "Time-1" of the logical volume 26L exists in the expiration date evaluation management table 44 (SP42) (#3).

Next, since the expiration date "Time-1" exists in the expiration date evaluation management table 44 (SP42: YES), and the RAID group ID column of the RAID group 23C is "1," the RAID group ID column of the RAID group 23D is "1" and the RAID group ID column of the RAID group 23E is "1" in the entry of the expiration date "Time-1" of the expiration date evaluation management table 44, the CPU 38 of the storage apparatus 3 refers to the evaluation (concentration) column 44E in the respective RAID group ID columns (#4).

Next, since the evaluation (concentration) column 44E in the RAID group ID column of the RAID group C is "2," the evaluation (concentration) column 44E in the RAID group ID column of the RAID group D is "3," and the evaluation (concentration) column 44E in the RAID group ID column of the RAID group E is "3," the CPU 38 of the storage apparatus 3 increments the RAID group ID column of the RAID group 23C from "1" to "2," increments the evaluation (timing) column 44D in the entry of the expiration date "Time-1" from "3" to "4," and increments the evaluation (concentration) column 44E in the RAID group ID column of the RAID group E from "2" to "3" (SP45). Next, the CPU 38 of the storage apparatus 3 writes the RAID group ID of the RAID group C column in the entry of the logical volume ID of the logical volume 26L in the expiration date management table 43 (SP46) (#5).

Next, by executing the same processing as in the case described above, the CPU 38 of the storage apparatus 3 writes the RAID group ID of the RAID group C column in the entry of the logical volume ID of the expiration date management table 43, writes the RAID group ID of the RAID group D column in the entry of the logical volume ID of the logical volume 26J in the expiration date management table 43, and writes the RAID group ID of the RAID group C column in the entry of the logical volume ID of the logical volume K in the expiration date management table 43 (SP46).

Next, since all logical volume IDs in the expiration date management table 43 have not been selected (SP47: NO), the CPU 38 of the storage apparatus 3 returns to step SP41, selects the logical volume ID of the logical volume 26M in the expiration date management table 43 (SP41), and checks whether the expiration date "Time-5" of the logical volume 26M exists in the expiration date evaluation management table 44 (SP42) (#6).

Next, since the expiration date "Time-5" does not exist in the expiration date evaluation management table 44 (SP42: NO), the CPU 38 of the storage apparatus 3 adds the ID "6" to the identification ID column 44A, and adds an entry of the expiration date "Time-5" by writing the expiration date "Time-5" in the expiration date column 44B in the entry of the ID "6" (SP43). Next, since the RAID group ID column of the RAID group 23C is "0," the RAID group ID column of the RAID group 23D is "0," and the RAID group ID column of the RAID group 23E is "0" in the entry of the expiration date "Time-5" of the expiration date evaluation management table 44, the CPU 38 of the storage apparatus 3 refers to the evaluation (concentration) column 44E in the respective RAID group ID columns (#7).

Next, since the evaluation (concentration) column 44E in the RAID group ID column of the RAID group C is "5," the evaluation (concentration) column 44E in the RAID group ID column of the RAID group D is "4," and the evaluation (concentration) column 44E in the RAID group ID column of the RAID group E is "3," the CPU 38 of the storage apparatus 3 increments the RAID group ID column of the RAID group 23E from "0" to "1," increments the evaluation (timing) column 44D in the entry of the expiration date "Time-5" from "0" to "1," and increments the evaluation (concentration) column 44E in the RAID group ID column of the RAID group E from "3" to "4" (SP45). Next, the CPU 38 of the storage apparatus 3 writes the RAID group ID of the RAID group E column in the entry of the logical volume ID of the logical volume 26M in the expiration date management table 43 (SP46) (#8).

Finally, since all logical volume IDs in the expiration date management table 43 have been selected (SP47: YES), the CPU 38 of the storage apparatus 3 thereafter ends the migration destination RAID group determination processing routine RT4 (SP48). The CPU 38 of the storage apparatus 3 determines the migration destination RAID group 23 as described above.

Figure 19:
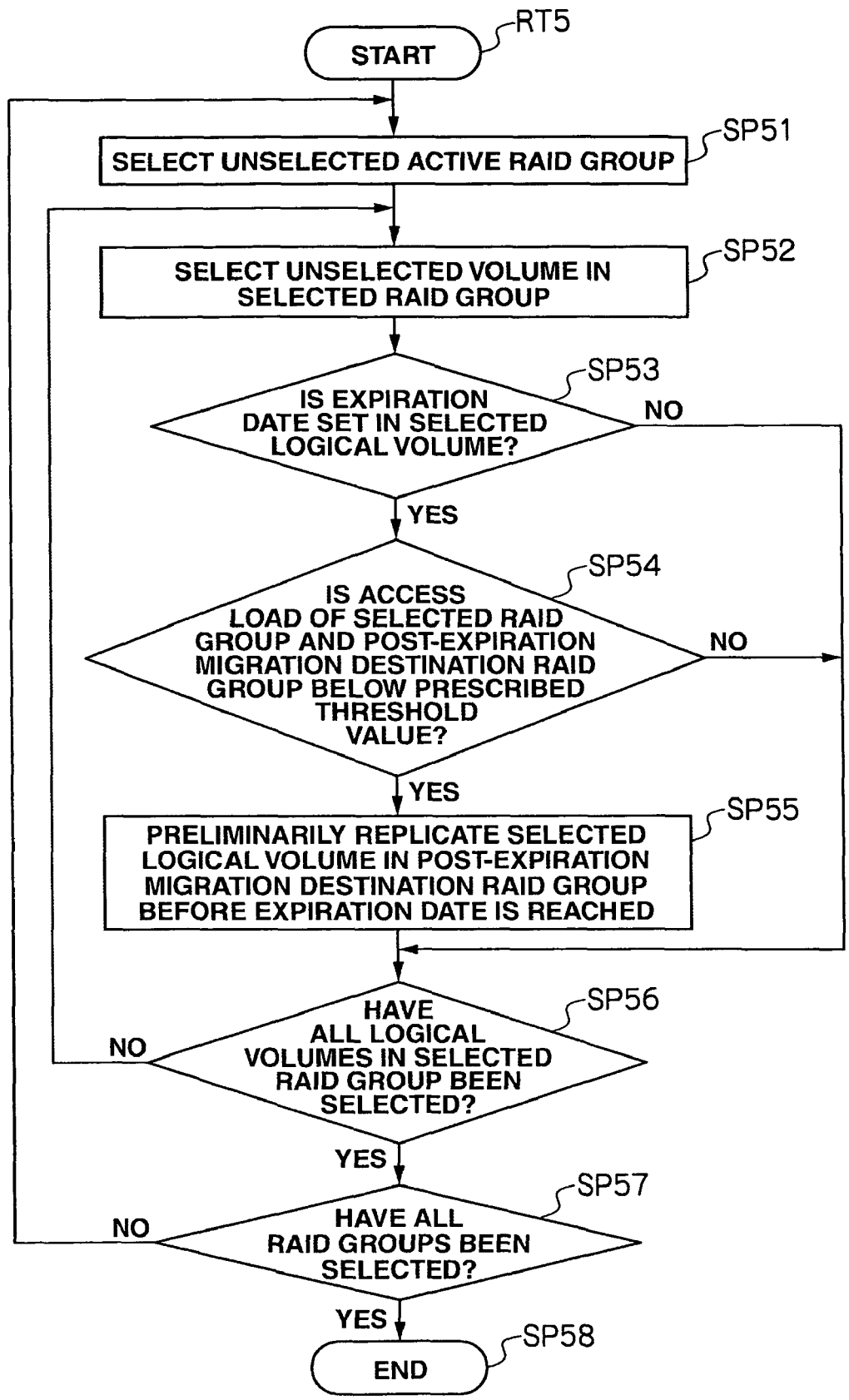
FIG. 19 is a flowchart showing a logical volume preliminary migration processing routine.

FIG. 19 shows an example of a flowchart showing a specific processing routine of the CPU 38 of the storage apparatus 3 concerning the logical volume preliminary migration processing in the power saving processing routine of the storage apparatus 3 in the storage system 1.

When the CPU 38 of the storage apparatus 3 shuts down the power source of the hard disk drives 22 of the migration source RAID group 23 (SP6), it selects an unselected RAID group 23 among the active RAID groups 23 in the storage apparatus 3 according to the logical volume preliminary migration processing routine RT5 shown in FIG. 19 (SP51).

Subsequently, the CPU 38 of the storage apparatus 3 selects an unselected logical volume 26 among the logical volumes 26 in the selected RAID group 23 (SP52).

Subsequently, the CPU 38 of the storage apparatus 3 checks whether an expiration date is set in the selected logical volume 26 (SP53). If an expiration date is not set in the selected logical volume 26 (SP53: NO), the CPU 38 of the storage apparatus 3 proceeds to step SP56. Meanwhile, if an expiration date is set in the selected logical volume 26 (SP53: YES), the CPU 38 of the storage apparatus 3 checks whether the access load of the post-expiration migration destination RAID group 27 (described later), which is the RAID group 23 to which the selected logical volume 26 is to be migrated after the expiration of the selected logical volume 26, set in each of the selected RAID groups 23 and the logical volumes 26 is below a prescribed threshold value (SP54).

If the access load of the selected RAID group 23 and the post-expiration migration destination RAID group 27 is not below a prescribed threshold value (SP54: NO), the CPU 38 of the storage apparatus 3 proceeds to step SP56. Meanwhile, if the access load of the selected RAID group 23 and the post-expiration migration destination RAID group 27 is below a prescribed threshold value (SP54: YES), the CPU 38 of the storage apparatus 3 preliminarily replicates the selected logical volume 26 in the post-expiration migration destination RAID group 27 of the logical volume 26 before the expiration date of the logical volume 26 is reached (SP55).

Subsequently, the CPU 38 of the storage apparatus 3 checks whether all logical volumes 26 in the selected RAID group 23 have been selected (SP56). If all logical volumes 26 in the selected RAID group 23 have not been selected (SP56: NO), the CPU 38 of the storage apparatus 3 returns to step SP52, once again selects an unselected logical volume 26 among the logical volumes 26 in the selected RAID group 23, and thereafter repeats the same processing as in the case described above (SP52 to SP56).

Meanwhile, if all logical volumes 26 in the selected RAID group 23 have been selected (SP56: YES), the CPU 38 of the storage apparatus 3 checks whether all active RAID groups 23 in the storage apparatus 3 have been selected (SP57). If all active RAID groups 23 in the storage apparatus 3 have not been selected (SP57: NO), the CPU 38 of the storage apparatus 3 returns to step SP51, once again selects an unselected RAID group 23 among the active RAID groups 23 in the storage apparatus 3, and thereafter repeats the same processing as in the case described above (SP51 to SP57).

Like this, since a logical volume 26 set with an expiration date will not be updated, the CPU 38 of the storage apparatus 3 is able to preliminarily replicate the selected logical volume 26 in the post-expiration migration destination RAID group 27 of that logical volume 26 before the expiration of such logical volume 26. In addition, depending on the usage of the post-expiration migration destination RAID group 27, the CPU 38 of the storage apparatus 3 may shut down the power source of the post-expiration migration destination RAID group 27 for power saving after the migration of the selected logical volume 26.

Meanwhile, if all active RAID groups 23 in the storage apparatus 3 have been selected (SP57: YES), the CPU 38 of the storage apparatus 3 thereafter ends the logical volume preliminary migration processing routine RT5 shown in FIG. 19 (SP58).

Figure 20:
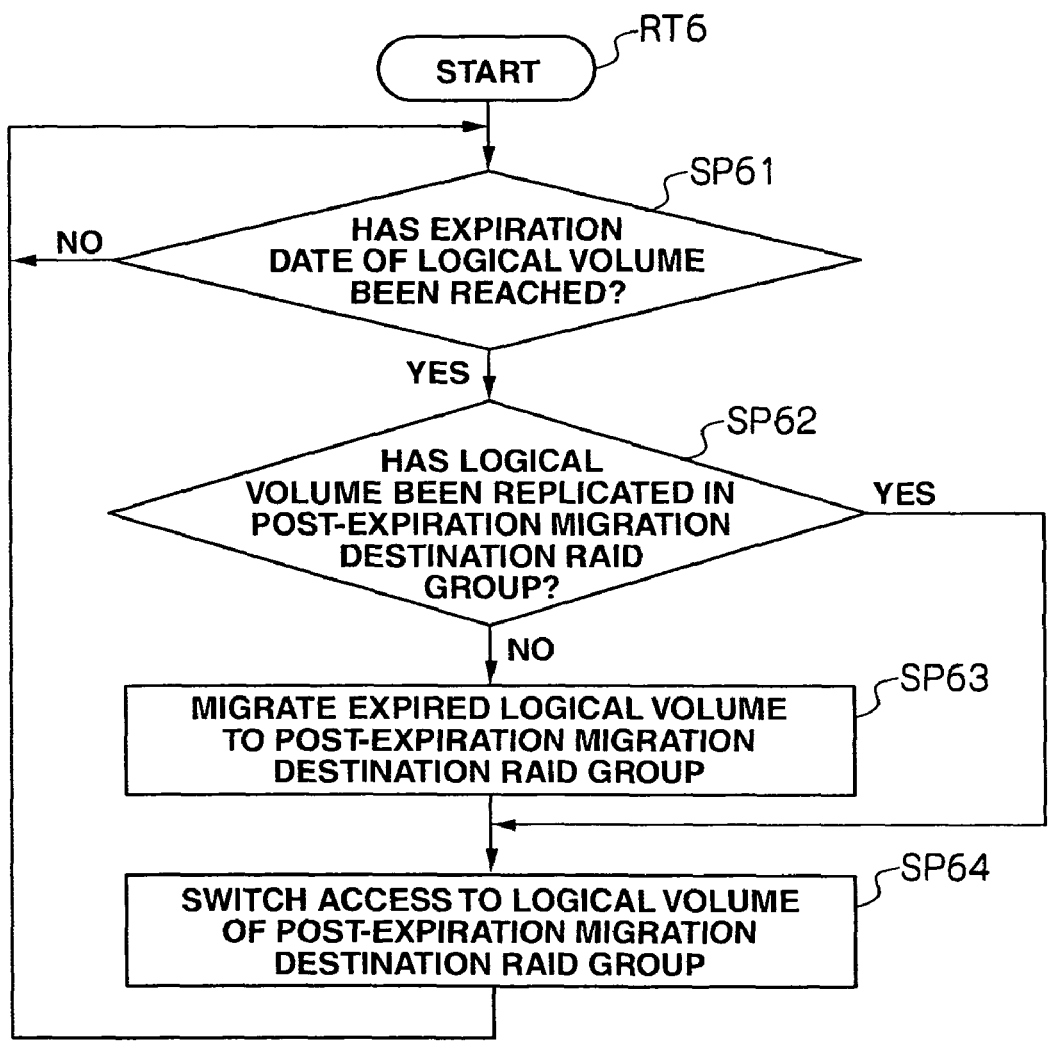
FIG. 20 is a flowchart showing a logical volume migration processing routine.

FIG. 20 is an example of a flowchart showing a specific processing routine of the CPU 38 of the storage apparatus 3 concerning the logical volume migration processing of the storage apparatus 3 in the storage system 1.

For instance, if an expiration date is set in any one of the logical volumes 26 in the storage apparatus 3, or when an expiration date has been set in any one of the logical volumes 26, by executing the logical volume migration program 42, the CPU 38 of the storage apparatus 3 waits in standby mode until the expiration date of any one of the logical volumes 26 of the RAID group 23 in the storage apparatus 3 is reached according to the logical volume migration processing routine RT5 shown in FIG. 20 (SP61).

If the expiration date of any one of the logical volumes 26 is reached (SP61: YES), the CPU 38 of the storage apparatus 3 checks whether the expired logical volume 26 has been replicated in the post-expiration migration destination RAID group 27 of such logical volume 26 (SP62). If the expired logical volume 26 has been replicated in the post-expiration migration destination RAID group 27 (SP62: YES), the CPU 38 of the storage apparatus 3 proceeds to step SP64. Meanwhile, if the expired logical volume 26 has not been replicated in the post-expiration migration destination RAID group 27 (SP62: NO), the CPU 38 of the storage apparatus 3 migrates the expired logical volume 26 to the post-expiration migration destination RAID group 27 of that logical volume 26 (SP63).

The CPU 38 of the storage apparatus 3 eventually switches the access to the migrated logical volume 26 or the replicated logical volume 26 in the post-expiration migration destination RAID group 27 (SP64), thereafter returns to step SP61, once again waits in standby mode for the expiration date of any one of the logical volumes 26 of the RAID group 23 in the storage apparatus 3 to be reached, and thereafter repeats the same processing as in the case described above (SP61 to SP64).

Like this, for example, since the CPU 38 of the storage apparatus 3 is able to preliminarily replicate a logical volume 26 in the post-expiration migration destination RAID group 27 before the expiration of that logical volume 26 during a time frame when the access load is small such as outside of business hours, the logical volume 26 will be migrated simply by switching the access of the logical volume 26 when the expiration date thereof is reached. Thus, it is possible to even more effectively prevent the collective migration of the logical volumes 26 as a result of the expiration dates being reached around the same time. Consequently, it is possible to prevent the hard disk drives 22 in the RAID group 23 from becoming overloaded, and prevent deterioration in the data access performance from the host system 2 to the logical volumes 26 of the RAID group 23.

(1-4) Operation and Effect

Figure 21:
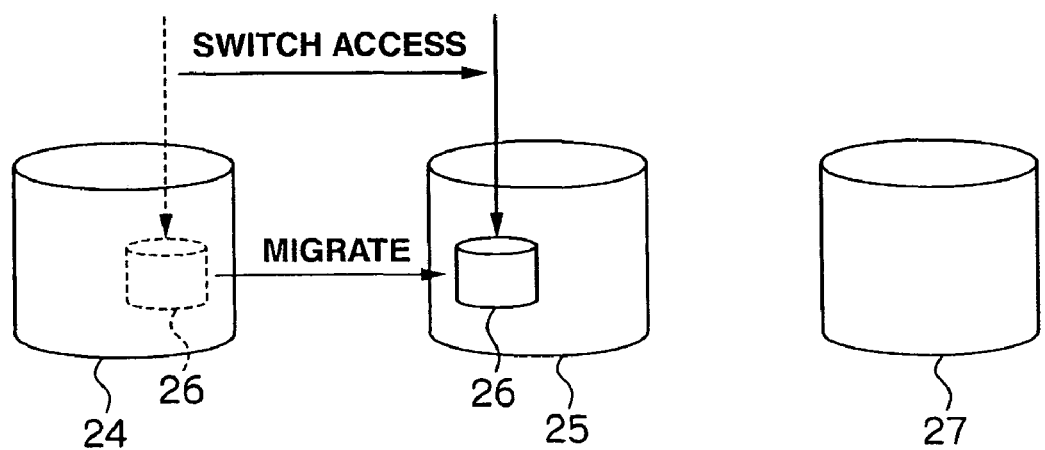
FIG. 21 is a conceptual diagram explaining power saving processing and logical volume migration processing.
Figure 22:
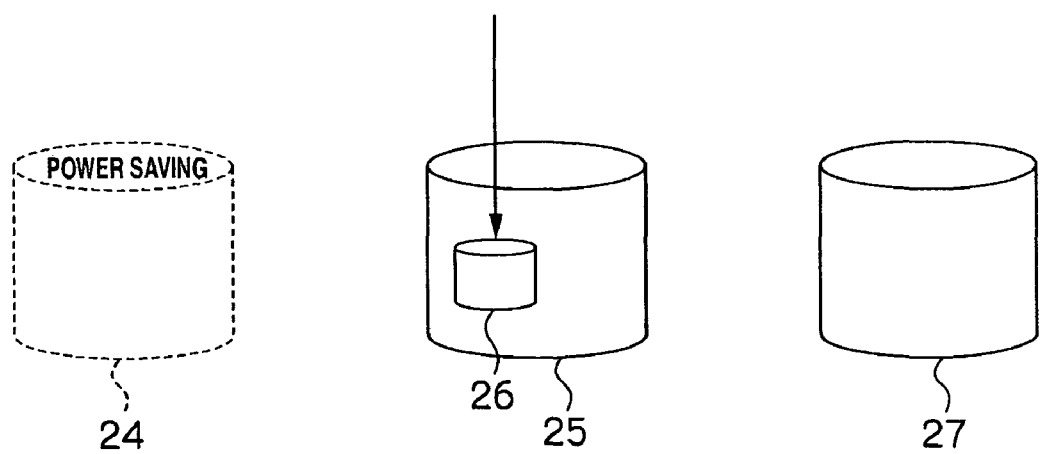
FIG. 22 is a conceptual diagram explaining power saving processing and logical volume migration processing.

As described above, with the storage system 1, when the storage apparatus 3 receives a power saving processing execution command upon the management apparatus 5 designating the power saving target RAID group 24, it migrates the logical volumes 26 stored in the power saving target RAID group 24 to the non-power saving target RAID group 25 in order to shut down the power source of the hard disk drives 22 of the power saving target RAID group 24 (FIG. 21). With the storage system 1, the storage apparatus 3 refers to the expiration date of the logical volumes 26, balances and migrates the logical volumes 26 by taking into consideration the migration timing to the post-expiration RAID group 27, and thereafter shuts down the power source of the power saving target RAID group 24 (FIG. 22).

Accordingly, since a plurality of logical volumes 26 stored in the same non-power saving target RAID group 25 in a concentrated manner will reach their expiration date around the same time and be migrated to the post-expiration RAID group 27, it is possible to effectively prevent the hard disk drives 22 of the non-power saving target RAID group 25 from becoming overloaded. Consequently, it is possible to prevent the deterioration in performance such as the data access during the migration of the logical volumes 26.

Here, with the storage system 1, the storage apparatus 3 migrates the logical volumes 26 to the non-power saving target RAID group 25 based on the number of logical volumes 26 set with the same expiration date in each of the non-power saving target RAID groups 25. In addition, with storage system 1, the storage apparatus 3 migrates the logical volumes 26 to the non-power saving target RAID group 25 based on the number of all logical volumes 26 in each of the non-power saving target RAID groups 25 when the number of logical volumes 26 set with the same expiration date for each non-power saving target RAID group 25 is the same.

Figure 23:
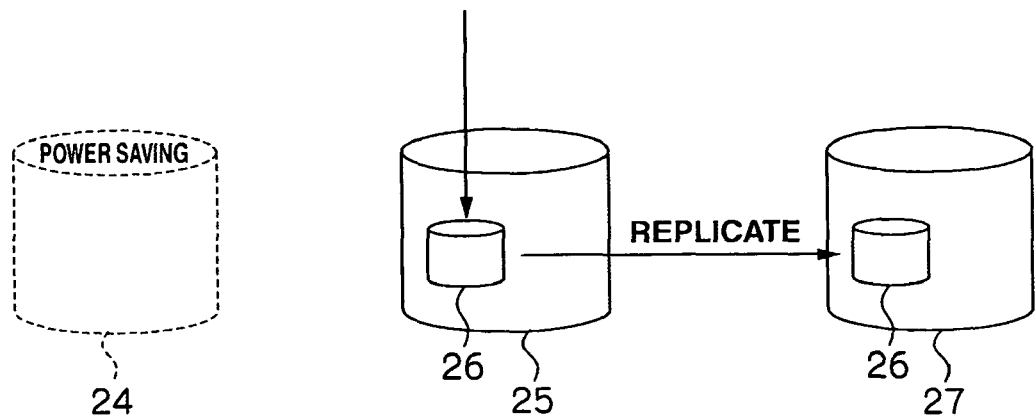
FIG. 23 is a conceptual diagram explaining power saving processing and logical volume migration processing.

Further, with the storage system 1, the storage apparatus 3 preliminarily replicates the logical volumes 26 from the non-power saving target RAID group 25 to the post-expiration migration destination RAID group 27 before the expiration of the logical volumes 26 during a time frame where the access load of the non-power saving target RAID group 25 and the post-expiration migration destination RAID group 27 is small (FIG. 23).

Accordingly, since the logical volumes 26 will be migrated simply by switching the access of the logical volumes 26 when the expiration date is reached, it is possible to more effectively prevent the collective migration of the logical volumes 26 due to the expiration dates being reached around the same time.

Figure 24:
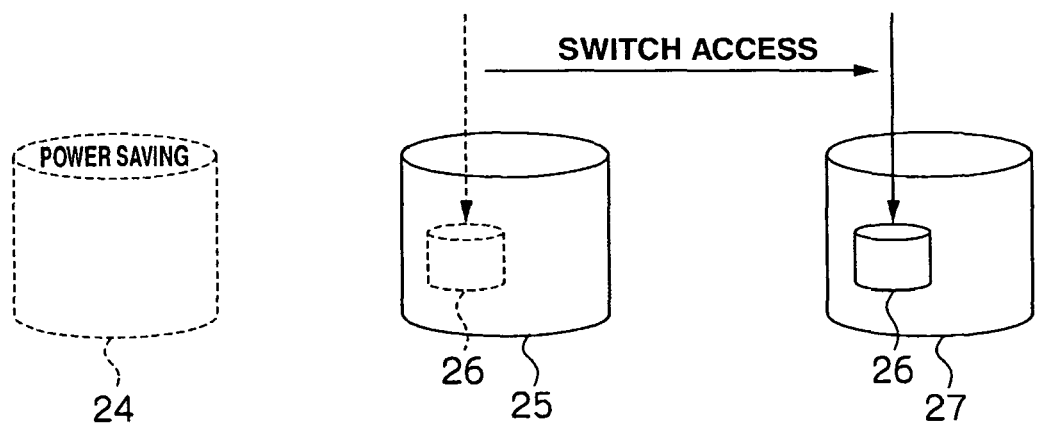
FIG. 24 is a conceptual diagram explaining power saving processing and logical volume migration processing.

With the storage system 1, when the expiration date is reached, without actually migrating the logical volumes 26, the logical volumes 26 will be migrated simply by the storage apparatus 3 switching the access of the logical volume 26 (FIG. 24). Here, with the storage system 1, the logical volumes 26 may also be deleted from the non-power saving target RAID group 25 after switching the access of the logical volumes 26.

Figure 25:
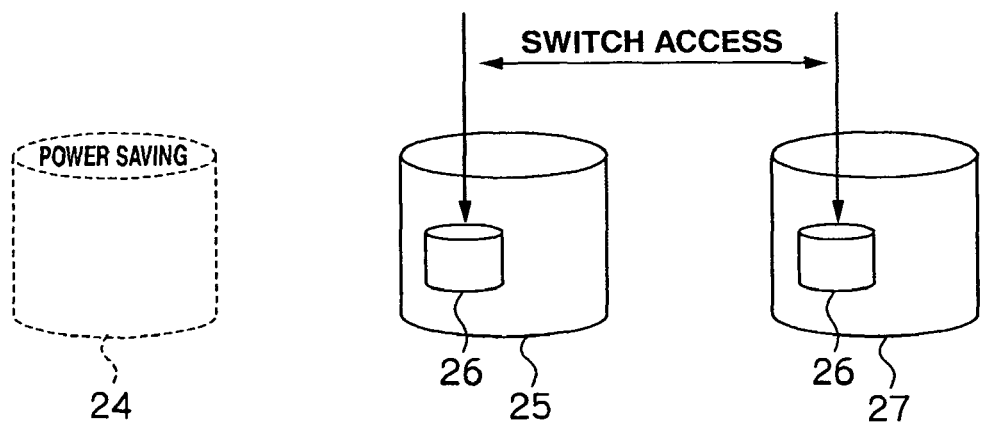
FIG. 25 is a conceptual diagram explaining power saving processing and logical volume migration processing.

With the storage system 1, if the access load of the logical volumes 26 of the non-power saving target RAID group 25 increases and there is fear of performance deterioration in the data access of the logical volumes 26 after replicating the logical volumes 26 in FIG. 23, the access load can be balanced by switching the access to the post-expiration migration destination RAID group 27. Consequently, it is possible to prevent the deterioration in performance such as data access during the migration of the logical volumes 26 (FIG. 25).

Figure 26:
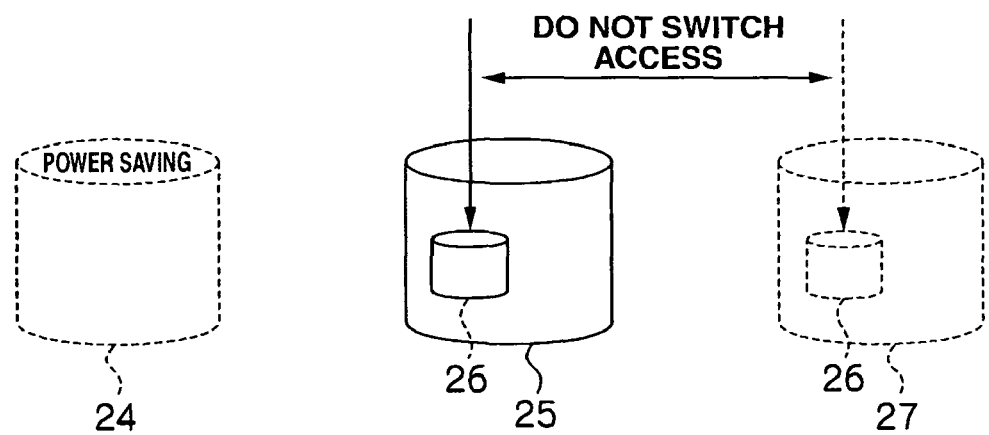
FIG. 26 is a conceptual diagram explaining power saving processing and logical volume migration processing.

Further, with the storage system 1, even if the access load of the logical volumes 26 of the non-power saving target RAID group 25 increases and there is fear of performance deterioration in the data access of the logical volumes 26 after replicating the logical volumes 26 in FIG. 23, so as long as the post-expiration migration destination RAID group 27 is subject to power saving and the power source thereof is shut down, access does not have to be switched to the post-expiration migration destination RAID group 27 (FIG. 26).

(2) Second Embodiment

With the storage system 1 according to the second embodiment, power saving processing is performed when an expiration date is newly set to the logical volume 26, or when the expiration date that has been set to the logical volume 26 is changed.

The storage system 1 of the second embodiment is configured the same as the storage system 1 of the first embodiment other than that the power saving processing routine RT7 based on the execution of the power saving program 41 is different from the power saving processing routine RT1 of the first embodiment.

Figure 27:
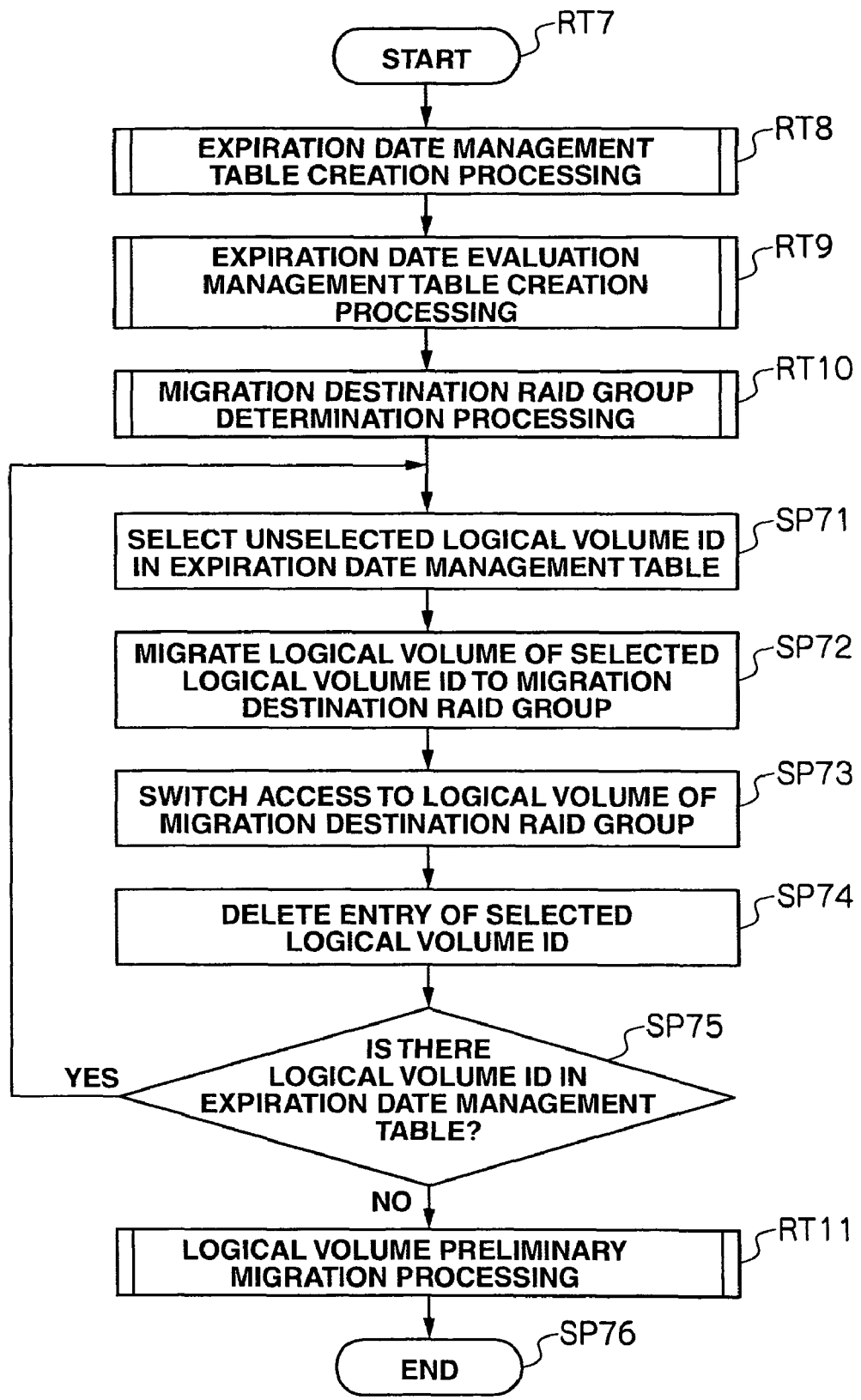
FIG. 27 is a flowchart showing a power saving processing routine according to a second embodiment of the present invention.

FIG. 27 is an example of a flowchart showing a specific processing routine of the CPU 38 of the storage apparatus 3 concerning the power saving processing of the storage apparatus 3 in the storage system 1 according to the second embodiment.

When the CPU 38 of the storage apparatus 3 receives, for example, an expiration date setting command of a new logical volume 26 or an expiration date change command of a logical volume 26 previously set with an expiration date from the management apparatus 5, by executing the power saving program 41, it executes the expiration date management table creation processing for creating the expiration date management table 43, the expiration date evaluation management table creation processing for creating the expiration date evaluation management table 44, and the migration destination RAID group determination processing for determining the migration destination RAID group 23 to which the logical volumes 26 of the power saving target RAID group 24 are to be migrated according to the power saving processing routine RT7 shown in FIG. 27 (RT8 to RT10).

The expiration date management table creation processing routine RT8 is the same as the expiration date management table creation processing routine RT2 of the first embodiment other than that all active RAID groups 23 are the target of selection, rather than only the unselected power saving target RAID groups 24 being the target of selection. The expiration date evaluation management table creation processing routine RT9 is the same as the expiration date evaluation management table creation processing routine RT3 other than that all active RAID groups 23 are the target of selection, rather than only the unselected non-power saving target RAID groups 25 being the target of selection. The migration destination RAID group determination processing routine RT10 is the same as the migration destination RAID group determination processing routine RT4 of the first embodiment.

Subsequently, the CPU 38 of the storage apparatus 3 executes the same processing as the processing from steps SPS1 to SP5 of the first embodiment (SP71 to SP75). Subsequently, the CPU 38 of the storage apparatus 3 executes the logical volume preliminary migration processing (RT11). The logical volume preliminary migration processing routine RT11 is the same as the logical volume preliminary migration processing routine RT5 of the first embodiment.

The CPU 38 of the storage apparatus 3 eventually ends the power saving processing routine RT7 shown in FIG. 27 (SP76).

Like this, with the storage system 1 of the second embodiment, when the storage apparatus 3 receives an expiration date setting command of a new logical volume 26 or an expiration date change command of a logical volume 26 previously set with an expiration date from the management apparatus 5, it refers to the expiration date of the logical volumes 26 with all active RAID groups 23 as the target of selection, and balances and migrates the logical volumes 26 by taking into consideration the migration timing to the post-expiration RAID group 27.

Accordingly, even when an expiration date is newly set after the standard power saving processing in which an expiration date is not set, or when the expiration date is changed after the power saving processing of the first embodiment, a plurality of logical volumes 26 stored in the same non-power saving target RAID group 25 in a concentrated manner will reach their expiration date around the same time and be migrated to the post-expiration RAID group 27, and it is possible to effectively prevent the hard disk drives 22 of the non-power saving target RAID group 25 from becoming overloaded. Consequently, it is possible to prevent the deterioration in performance such as the data access during the migration of the logical volumes 26.

Although the present embodiment explained a case of migrating the logical volumes 26 stored in the RAID group 23, the present invention is not limited thereto, and can also be applied to various cases such as when migrating data stored in the hard disks or LDEV stored in the logical volumes.

The present invention can be broadly applied to storage apparatuses that perform power saving processing of hard disk drives.

What is claimed is:

1. A storage apparatus, the storage apparatus comprising:
a plurality of hard disk drives,
wherein the hard disk drives are organized into a plurality of disk groups,
wherein each of the disk groups includes one or more of the hard disk drives,
wherein the hard disk drives provide a plurality of logical volumes to a host system,
wherein each of the logical volumes is defined on one of the disk groups,
and wherein each of the logical volumes has an expiration date, wherein the expiration date of each logical volume is a deadline for migrating the logical volume from a current disk group in which the logical volume is defined to another disk group;
a first logical volume migration unit for migrating a first logical volume from a first disk group of the disk groups to a second disk group of the disk groups based on an external command,
wherein some of the disk groups are targeted for power source shutdown and others of the disk groups are not targeted for power source shutdown,
wherein the first disk group is among the disk groups that are targeted for power source shutdown and the second disk group is among the disks groups that are not targeted for power source shutdown,
wherein the first logical volume migration unit migrating the first logical volume includes the first logical volume migration unit selecting the second disk group as a migration destination for the first logical volume based on an expiration date of the first logical volume and expiration dates of other logical volumes defined on the second disk group, and
wherein the first logical volume migration unit migrates the first logical volume from the first disk group to the second disk group such that logical volumes that have a same expiration date are balanced among the disk groups that are not targeted for power source shutdown;
a power source shutdown unit for shutting down a power source of a hard disk drive of the first disk group after the first logical volume is migrated by the first logical volume migration unit; and
a second logical volume migration unit for migrating the first logical volume from the second disk group to a third disk group of the disk groups when the expiration date of the first logical volume is reached.

2. The storage apparatus according to claim 1,
wherein the second logical volume migration unit replicates the first logical volume from the second disk group to the third disk group during a time frame when the second disk group and the third disk group have a small access load.

3. The storage apparatus according to claim 1,
wherein, when the first logical volume has been replicated to the third disk group, the second logical volume migration unit switches access to the first logical volume replicated in third disk group.

4. The storage apparatus according to claim 1,
wherein the first logical volume migration unit migrates the first logical volume to the second disk group when an expiration date is newly set for the first logical volume or when an expiration date of the first logical volume is changed.

5. A logical volume migration method for use in a storage apparatus, wherein the storage apparatus includes a plurality of hard disk drives,
wherein the hard disk drives are organized into a plurality of disk groups,
wherein each of the disk groups includes include one or more of the hard disk drives,
wherein the hard disk drives provide a plurality of logical volumes to a host system,
wherein each of the logical volumes is defined on one of the disk groups,
and wherein each of the logical volumes has an expiration date, wherein the expiration date of each logical volume is a deadline for migrating the logical volume from a current disk group in which the logical volume is defined to another disk group, the method comprising:
a first step of migrating a first logical volume from a first disk group of the disk groups to a second disk group of the disk groups based on an external command,
wherein some of the disk groups are targeted for power source shutdown and others of the disk groups are not targeted for power source shutdown,
wherein the first disk group is among the disk groups that are targeted for power source shutdown and the second disk group is among the disks groups that are not targeted for power source shutdown,
wherein the first step includes:
selecting the second disk group as a migration destination for the first logical volume based on an expiration date of the first logical volume and expiration dates of other logical volumes defined on the second disk group; and
migrating the first logical volume from the first disk group to the second disk group such that logical volumes that have a same expiration date are balanced among the disk groups that are not targeted for power source shutdown;

a second step of shutting down a power source of a hard disk drive of the first storage disk group after the first logical volume is migrated at the first step; and a third step of migrating the first logical volume from the second disk group to a third disk group of the disk groups when the expiration date of the first logical volume is reached.

6. The logical volume migration method according to claim 5, wherein, at the third step, the first logical volume is replicated from the second disk group to the third disk group during a time frame when the second disk group and the third disk group have a small access load.

7. The logical volume migration method according to claim 6, wherein, at the third step, when the first logical volume has been replicated to the third disk group, access is switched to the first logical volume replicated in the third disk group.

8. The logical volume migration method according to claim 5, wherein, at the first step, the first logical volume is migrated to the second disk group when an expiration date is newly set to the first logical volume or when an expiration date of the first logical volume is changed.

* * * * *